US010225592B2

(12) United States Patent
Peters et al.

(10) Patent No.: US 10,225,592 B2
(45) Date of Patent: Mar. 5, 2019

(54) METHODS AND APPARATUS FOR CONTENT DELIVERY AND REPLACEMENT IN A NETWORK

(71) Applicant: Time Warner Cable Enterprises LLC, New York, NY (US)

(72) Inventors: Michael James Peters, Herndon, VA (US); Charles A. Hasek, Broomfield, CO (US); Glen Hardin, Charlotte, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 27 days.

(21) Appl. No.: 14/821,558

(22) Filed: Aug. 7, 2015

(65) Prior Publication Data

US 2016/0037196 A1 Feb. 4, 2016

Related U.S. Application Data

(63) Continuation of application No. 11/726,095, filed on Mar. 20, 2007, now abandoned.

(51) Int. Cl.
*H04N 21/25* (2011.01)
*H04N 21/254* (2011.01)
(Continued)

(52) U.S. Cl.
CPC ..... *H04N 21/2541* (2013.01); *H04N 7/17318* (2013.01); *H04N 21/25816* (2013.01);
(Continued)

(58) Field of Classification Search
None
See application file for complete search history.

(56) References Cited

U.S. PATENT DOCUMENTS

| 4,521,881 A | 6/1985 | Stapleford et al. |
| 4,546,382 A | 10/1985 | McKenna et al. |

(Continued)

FOREIGN PATENT DOCUMENTS

| CA | 2643806 C | 6/2013 |
| GB | 2405567 A | 3/2005 |

(Continued)

OTHER PUBLICATIONS

Cisco Intelligent Network Architecture for Digital Video—SCTE Cable-Tec Expo 2004 information page, Orange County Convention Center, Jun. 2004, 24 pages.

(Continued)

*Primary Examiner* — Cai Y Chen
(74) *Attorney, Agent, or Firm* — Gazdzinski & Associates, PC

(57) ABSTRACT

Methods and apparatus for providing an alternate content delivery mechanism available to content-based network users. In one embodiment, the network comprises a cable television network, and subscribers are able to retrieve requested content from one or more other subscriber's storage medium and without going outside the cable network (or accessing the network core in any significant capacity) using a peer-to-peer (P2P) network protocol. Using this approach, bandwidth consumption is advantageously pushed out to the edge of the network from the core, also obviating content requests outside the network (e.g., to third-party servers on the Internet). Methods of operating the aforementioned P2P network, and various business paradigms relating thereto, are also disclosed.

20 Claims, 17 Drawing Sheets

(51) Int. Cl.
  *H04N 7/173*     (2011.01)
  *H04N 21/435*    (2011.01)
  *H04N 21/61*     (2011.01)
  *H04N 21/63*     (2011.01)
  *H04N 21/6405*   (2011.01)
  *H04N 21/258*    (2011.01)
  *H04N 21/4627*   (2011.01)

(52) U.S. Cl.
  CPC ..... *H04N 21/4351* (2013.01); *H04N 21/4627* (2013.01); *H04N 21/6168* (2013.01); *H04N 21/632* (2013.01); *H04N 21/6405* (2013.01)

(56) References Cited

U.S. PATENT DOCUMENTS

| | | |
|---|---|---|
| 4,602,279 A | 7/1986 | Freeman |
| 4,930,120 A | 5/1990 | Baxter et al. |
| 5,155,591 A | 10/1992 | Wachob |
| 5,233,423 A | 8/1993 | Jernigan et al. |
| 5,313,454 A | 5/1994 | Bustini et al. |
| 5,361,091 A | 11/1994 | Hoarty et al. |
| 5,600,364 A | 2/1997 | Hendricks et al. |
| RE35,651 E | 11/1997 | Bradley et al. |
| 5,734,380 A | 3/1998 | Adams et al. |
| 5,758,257 A | 5/1998 | Herz et al. |
| 5,774,170 A | 6/1998 | Hite et al. |
| 5,793,954 A | 8/1998 | Rao |
| 5,815,662 A | 9/1998 | Ong |
| 5,862,312 A | 1/1999 | Mann et al. |
| 5,878,324 A | 3/1999 | Borth et al. |
| 5,886,995 A | 3/1999 | Arsenault et al. |
| 5,914,945 A | 6/1999 | Abu-Amara et al. |
| 5,926,205 A | 7/1999 | Krause et al. |
| 5,935,206 A | 8/1999 | Dixon et al. |
| 5,963,844 A | 10/1999 | Dail |
| 6,002,393 A | 12/1999 | Hite et al. |
| 6,018,359 A | 1/2000 | Kermode et al. |
| 6,047,327 A | 4/2000 | Tso et al. |
| 6,081,830 A | 6/2000 | Schindler |
| 6,092,178 A | 7/2000 | Jindal et al. |
| 6,105,134 A | 8/2000 | Pinder et al. |
| 6,124,878 A | 9/2000 | Adams et al. |
| 6,128,316 A | 10/2000 | Takeda et al. |
| 6,134,532 A | 10/2000 | Lazarus et al. |
| 6,157,377 A | 12/2000 | Shah-Nazaroff et al. |
| 6,161,142 A | 12/2000 | Wolfe et al. |
| 6,167,432 A | 12/2000 | Jiang |
| 6,169,728 B1 | 1/2001 | Perreault et al. |
| 6,175,856 B1 | 1/2001 | Riddle |
| 6,182,050 B1 | 1/2001 | Ballard |
| 6,211,869 B1 | 4/2001 | Loveman et al. |
| 6,211,901 B1 | 4/2001 | Imajima et al. |
| 6,216,129 B1 | 4/2001 | Eldering |
| 6,216,152 B1 | 4/2001 | Wong et al. |
| 6,219,710 B1 | 4/2001 | Gray et al. |
| 6,219,840 B1 | 4/2001 | Corrigan et al. |
| 6,240,243 B1 | 5/2001 | Chen et al. |
| 6,240,553 B1 | 5/2001 | Son et al. |
| 6,252,964 B1 | 6/2001 | Wasilewski et al. |
| 6,256,393 B1 | 7/2001 | Safadi et al. |
| 6,330,609 B1 | 12/2001 | Garofalakis et al. |
| 6,337,715 B1 | 1/2002 | Inagaki et al. |
| 6,345,279 B1 | 2/2002 | Li et al. |
| 6,353,626 B1 | 3/2002 | Sunay et al. |
| 6,378,130 B1 | 4/2002 | Adams |
| 6,434,141 B1 | 8/2002 | Oz et al. |
| 6,446,261 B1 | 9/2002 | Rosser |
| 6,463,508 B1 | 10/2002 | Wolf et al. |
| 6,463,585 B1 | 10/2002 | Hendricks et al. |
| 6,487,721 B1 | 11/2002 | Safadi |
| 6,498,783 B1 | 12/2002 | Lin |
| 6,502,139 B1 | 12/2002 | Birk et al. |
| 6,516,412 B2 | 2/2003 | Wasilewski et al. |
| 6,560,578 B2 | 5/2003 | Eldering |
| 6,590,865 B1 | 7/2003 | Ibaraki et al. |
| 6,594,699 B1 | 7/2003 | Sahai et al. |
| 6,601,237 B1 | 7/2003 | Ten Kate et al. |
| 6,604,138 B1 | 8/2003 | Virine et al. |
| 6,615,039 B1 | 9/2003 | Eldering |
| 6,615,251 B1 | 9/2003 | Klug et al. |
| 6,651,103 B1 | 11/2003 | Markowitz et al. |
| 6,671,736 B2 | 12/2003 | Virine et al. |
| 6,687,735 B1 | 2/2004 | Logston et al. |
| 6,700,624 B2 | 3/2004 | Yun |
| 6,718,551 B1 | 4/2004 | Swix et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,738,978 B1 | 5/2004 | Hendricks et al. |
| 6,742,187 B1 | 5/2004 | Vogel |
| 6,745,245 B1 | 6/2004 | Carpenter |
| 6,763,391 B1 | 7/2004 | Ludtke |
| 6,771,290 B1 | 8/2004 | Hoyle |
| 6,772,435 B1 | 8/2004 | Thexton et al. |
| 6,775,843 B1 | 8/2004 | McDermott |
| 6,799,196 B1 | 9/2004 | Smith |
| 6,839,757 B1 | 1/2005 | Romano et al. |
| 6,842,783 B1 | 1/2005 | Boivie et al. |
| 6,859,839 B1 | 2/2005 | Zahorjan et al. |
| 6,868,439 B2 | 3/2005 | Basu et al. |
| 6,891,841 B2 | 5/2005 | Leatherbury et al. |
| 6,898,800 B2 | 5/2005 | Son et al. |
| 6,917,628 B2 | 7/2005 | McKinnin et al. |
| 6,944,166 B1 | 9/2005 | Perinpanathan et al. |
| 6,948,183 B1 | 9/2005 | Peterka |
| 6,961,430 B1 | 11/2005 | Gaske et al. |
| 6,977,691 B1 | 12/2005 | Middleton et al. |
| 6,981,045 B1 * | 12/2005 | Brooks ............ H04L 29/06027 348/E7.073 |
| 6,985,934 B1 | 1/2006 | Armstrong et al. |
| 6,986,156 B1 | 1/2006 | Rodriguez et al. |
| 7,010,801 B1 | 3/2006 | Jerding et al. |
| 7,017,174 B1 | 3/2006 | Sheedy |
| 7,024,461 B1 | 4/2006 | Janning et al. |
| 7,024,676 B1 | 4/2006 | Klopfenstein |
| 7,027,460 B2 | 4/2006 | Iyer et al. |
| 7,039,116 B1 | 5/2006 | Zhang et al. |
| 7,039,169 B2 | 5/2006 | Jones |
| 7,039,614 B1 | 5/2006 | Candelore |
| 7,039,938 B2 | 5/2006 | Candelore |
| 7,047,309 B2 | 5/2006 | Baumann et al. |
| 7,058,387 B2 | 6/2006 | Kumar et al. |
| 7,069,573 B1 | 6/2006 | Brooks et al. |
| 7,073,189 B2 | 7/2006 | McElhatten et al. |
| 7,075,945 B2 | 7/2006 | Arsenault et al. |
| 7,085,839 B1 | 8/2006 | Baugher et al. |
| 7,086,077 B2 | 8/2006 | Giammaressi |
| 7,088,910 B2 | 8/2006 | Potrebic et al. |
| 7,089,577 B1 | 8/2006 | Rakib et al. |
| 7,093,272 B1 | 8/2006 | Shah-Nazaroff et al. |
| 7,100,183 B2 | 8/2006 | Kunkel et al. |
| 7,103,906 B1 | 9/2006 | Katz et al. |
| 7,107,462 B2 | 9/2006 | Fransdonk |
| 7,110,457 B1 | 9/2006 | Chen et al. |
| 7,127,619 B2 | 10/2006 | Unger et al. |
| 7,133,837 B1 | 11/2006 | Barnes, Jr. |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,174,385 B2 | 2/2007 | Li |
| 7,178,161 B1 | 2/2007 | Fristoe et al. |
| 7,181,010 B2 | 2/2007 | Russ et al. |
| 7,181,760 B1 | 2/2007 | Wallace |
| 7,191,461 B1 | 3/2007 | Arsenault et al. |
| 7,194,752 B1 | 3/2007 | Kenyon et al. |
| 7,194,756 B2 | 3/2007 | Addington et al. |
| 7,200,788 B2 | 4/2007 | Hiraki et al. |
| 7,203,940 B2 | 4/2007 | Barmettler et al. |
| 7,207,055 B1 | 4/2007 | Hendricks et al. |
| 7,216,265 B2 | 5/2007 | Hughes et al. |
| 7,225,164 B1 | 5/2007 | Candelore et al. |
| 7,225,458 B2 | 5/2007 | Klauss et al. |

(56) References Cited

U.S. PATENT DOCUMENTS

| | | |
|---|---|---|
| 7,228,555 B2 | 6/2007 | Schlack |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,246,366 B1 | 7/2007 | Addington et al. |
| 7,254,608 B2 | 8/2007 | Yeager et al. |
| 7,257,650 B2 | 8/2007 | Maciesowicz |
| 7,266,198 B2 | 9/2007 | Medvinsky |
| 7,266,611 B2 | 9/2007 | Jabri et al. |
| 7,266,726 B1 | 9/2007 | Ladd et al. |
| 7,283,782 B2 | 10/2007 | Sinnarajah et al. |
| 7,296,074 B2 | 11/2007 | Jagels |
| 7,299,290 B2 | 11/2007 | Karpoff |
| 7,305,691 B2 | 12/2007 | Cristofalo |
| 7,308,415 B2 | 12/2007 | Kimbrel et al. |
| 7,317,728 B2 | 1/2008 | Acharya et al. |
| 7,320,134 B1 | 1/2008 | Tomsen et al. |
| 7,325,073 B2 | 1/2008 | Shao et al. |
| 7,327,692 B2 | 2/2008 | Ain et al. |
| 7,334,044 B1 | 2/2008 | Allen |
| 7,340,759 B1 | 3/2008 | Rodriguez |
| 7,346,688 B2 | 3/2008 | Allen et al. |
| 7,346,917 B2 | 3/2008 | Gatto et al. |
| 7,352,775 B2 | 4/2008 | Powell |
| 7,355,980 B2 | 4/2008 | Bauer et al. |
| 7,363,371 B2 | 4/2008 | Kirkby et al. |
| 7,370,120 B2 | 5/2008 | Kirsch et al. |
| 7,376,386 B2 | 5/2008 | Phillips et al. |
| 7,379,494 B2 | 5/2008 | Raleigh et al. |
| 7,403,618 B2 | 7/2008 | Van Rijnsoever et al. |
| 7,434,245 B1 | 10/2008 | Shiga et al. |
| 7,457,520 B2 | 11/2008 | Rossetti et al. |
| 7,464,179 B2 | 12/2008 | Hodges et al. |
| 7,555,006 B2 | 6/2009 | Wolfe et al. |
| 7,567,565 B2 | 7/2009 | La Joie |
| 7,577,118 B2 | 8/2009 | Haumonte et al. |
| 7,602,820 B2 | 10/2009 | Helms et al. |
| 7,617,516 B2 | 11/2009 | Huslak et al. |
| 7,630,401 B2 | 12/2009 | Iwamura |
| 7,689,995 B1 | 3/2010 | Francis et al. |
| 7,690,020 B2 | 3/2010 | Lebar |
| 7,720,986 B2 | 5/2010 | Savoor et al. |
| 7,721,313 B2 | 5/2010 | Barrett |
| 7,757,251 B2 | 7/2010 | Gonder et al. |
| 7,763,360 B2 | 7/2010 | Paul et al. |
| 7,779,097 B2 | 8/2010 | Lamkin et al. |
| 7,783,316 B1 | 8/2010 | Mitchell |
| 7,805,052 B2 | 9/2010 | Nakamura et al. |
| 7,805,741 B2 | 9/2010 | Yeh |
| 7,836,178 B1 | 11/2010 | Bedell et al. |
| 7,908,626 B2 | 3/2011 | Williamson et al. |
| 7,917,008 B1 | 3/2011 | Lee et al. |
| 7,930,715 B2 | 4/2011 | Hendricks et al. |
| 8,122,479 B2 | 2/2012 | Britt |
| 8,170,065 B2 | 5/2012 | Hasek et al. |
| 8,280,982 B2 | 10/2012 | La Joie et al. |
| 8,290,351 B2 | 10/2012 | Plotnick et al. |
| 8,291,453 B2 | 10/2012 | Boortz et al. |
| 8,341,242 B2 | 12/2012 | Dillon et al. |
| 8,359,351 B2 | 1/2013 | Istvan et al. |
| 8,365,212 B1 | 1/2013 | Orlowski |
| 8,392,952 B2 | 3/2013 | Carlucci et al. |
| 8,458,125 B1 | 6/2013 | Chong, Jr. et al. |
| 8,468,099 B2 | 6/2013 | Headings et al. |
| 8,516,533 B2 | 8/2013 | Davis et al. |
| 8,561,116 B2 | 10/2013 | Hasek |
| 8,634,703 B1 | 1/2014 | Barton |
| 8,726,303 B2 | 5/2014 | Ellis, III |
| 8,804,519 B2 | 8/2014 | Svedberg |
| 8,843,973 B2 | 9/2014 | Morrison |
| 8,997,136 B2 | 3/2015 | Brooks et al. |
| 9,071,859 B2 | 6/2015 | LaJoie |
| 9,178,634 B2 | 11/2015 | Tidwell et al. |
| 9,277,266 B2 | 3/2016 | Riedl et al. |
| 2001/0013123 A1 | 8/2001 | Freeman et al. |
| 2001/0030785 A1 | 10/2001 | Pangrac et al. |
| 2001/0050901 A1 | 12/2001 | Love et al. |
| 2002/0004912 A1 | 1/2002 | Fung |
| 2002/0019984 A1 | 2/2002 | Rakib |
| 2002/0032754 A1 | 3/2002 | Logston et al. |
| 2002/0049902 A1 | 4/2002 | Rhodes |
| 2002/0049980 A1 | 4/2002 | Hoang |
| 2002/0053082 A1 | 5/2002 | Weaver et al. |
| 2002/0054589 A1 | 5/2002 | Ethridge et al. |
| 2002/0059577 A1 | 5/2002 | Lu et al. |
| 2002/0059619 A1 | 5/2002 | Lebar |
| 2002/0063621 A1 | 5/2002 | Tseng et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100059 A1 | 7/2002 | Buehl et al. |
| 2002/0104083 A1 | 8/2002 | Hendricks et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0124249 A1 | 9/2002 | Shintani et al. |
| 2002/0129378 A1 | 9/2002 | Cloonan et al. |
| 2002/0144262 A1 | 10/2002 | Plotnick et al. |
| 2002/0144263 A1 | 10/2002 | Eldering et al. |
| 2002/0144275 A1 | 10/2002 | Kay et al. |
| 2002/0147771 A1 | 10/2002 | Traversat et al. |
| 2002/0152299 A1 | 10/2002 | Traversat et al. |
| 2002/0154655 A1 | 10/2002 | Gummalla et al. |
| 2002/0154885 A1 | 10/2002 | Covell et al. |
| 2002/0162109 A1 | 10/2002 | Shteyn |
| 2002/0163928 A1 | 11/2002 | Rudnick et al. |
| 2002/0164151 A1 | 11/2002 | Jasinschi et al. |
| 2002/0166119 A1 | 11/2002 | Cristofalo |
| 2002/0170057 A1 | 11/2002 | Barrett et al. |
| 2002/0174430 A1 | 11/2002 | Ellis et al. |
| 2002/0178447 A1 | 11/2002 | Plotnick et al. |
| 2002/0196939 A1 | 12/2002 | Unger et al. |
| 2003/0002862 A1 | 1/2003 | Rodriguez et al. |
| 2003/0004810 A1 | 1/2003 | Eldering |
| 2003/0005453 A1 | 1/2003 | Rodriguez et al. |
| 2003/0007516 A1 | 1/2003 | Abramov et al. |
| 2003/0014759 A1* | 1/2003 | Van Stam ......... G06F 17/30029 725/97 |
| 2003/0021412 A1 | 1/2003 | Candelore et al. |
| 2003/0023981 A1 | 1/2003 | Lemmons |
| 2003/0025832 A1 | 2/2003 | Swart et al. |
| 2003/0033199 A1 | 2/2003 | Coleman |
| 2003/0037331 A1 | 2/2003 | Lee |
| 2003/0046704 A1 | 3/2003 | Laksono et al. |
| 2003/0056217 A1 | 3/2003 | Brooks |
| 2003/0061619 A1 | 3/2003 | Giammaressi |
| 2003/0067554 A1 | 4/2003 | Klarfeld |
| 2003/0074565 A1 | 4/2003 | Wasilewski et al. |
| 2003/0077067 A1 | 4/2003 | Wu et al. |
| 2003/0088876 A1 | 5/2003 | Mao et al. |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0095791 A1 | 5/2003 | Barton et al. |
| 2003/0101449 A1 | 5/2003 | Bentolila et al. |
| 2003/0101451 A1 | 5/2003 | Bentolila et al. |
| 2003/0110499 A1 | 6/2003 | Knudson et al. |
| 2003/0115612 A1 | 6/2003 | Mao et al. |
| 2003/0118014 A1* | 6/2003 | Iyer ..................... H04N 5/782 370/389 |
| 2003/0135860 A1 | 7/2003 | Dureau |
| 2003/0139980 A1 | 7/2003 | Hamilton |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0161473 A1 | 8/2003 | Fransdonk |
| 2003/0179773 A1 | 9/2003 | Mocek et al. |
| 2003/0182261 A1 | 9/2003 | Patterson |
| 2003/0208763 A1 | 11/2003 | McElhatten et al. |
| 2003/0208783 A1 | 11/2003 | Hillen et al. |
| 2003/0214962 A1 | 11/2003 | Allaye-Chan et al. |
| 2003/0217365 A1 | 11/2003 | Caputo |

(56) References Cited

U.S. PATENT DOCUMENTS

| | | |
|---|---|---|
| 2003/0229681 A1 | 12/2003 | Levitan |
| 2003/0235393 A1 | 12/2003 | Boston et al. |
| 2003/0237090 A1 | 12/2003 | Boston et al. |
| 2004/0006625 A1 | 1/2004 | Saha et al. |
| 2004/0010807 A1 | 1/2004 | Urdang et al. |
| 2004/0031053 A1 | 2/2004 | Lim et al. |
| 2004/0045030 A1 | 3/2004 | Reynolds et al. |
| 2004/0078809 A1 | 4/2004 | Drazin |
| 2004/0101271 A1 | 5/2004 | Boston et al. |
| 2004/0103437 A1* | 5/2004 | Allegrezza ......... H04N 7/17336 725/95 |
| 2004/0109672 A1 | 6/2004 | Kim et al. |
| 2004/0113936 A1 | 6/2004 | Dempski |
| 2004/0123313 A1 | 6/2004 | Koo et al. |
| 2004/0133907 A1 | 7/2004 | Rodriguez et al. |
| 2004/0146006 A1 | 7/2004 | Jackson |
| 2004/0158858 A1 | 8/2004 | Paxton et al. |
| 2004/0163109 A1 | 8/2004 | Kang et al. |
| 2004/0179605 A1 | 9/2004 | Lane |
| 2004/0181800 A1 | 9/2004 | Rakib et al. |
| 2004/0187150 A1 | 9/2004 | Gonder et al. |
| 2004/0187159 A1 | 9/2004 | Gaydos et al. |
| 2004/0193648 A1 | 9/2004 | Lai et al. |
| 2004/0193704 A1 | 9/2004 | Smith |
| 2004/0194134 A1 | 9/2004 | Gunatilake et al. |
| 2004/0226044 A1 | 11/2004 | Goode |
| 2004/0244058 A1 | 12/2004 | Carlucci et al. |
| 2004/0254999 A1 | 12/2004 | Bulleit et al. |
| 2004/0255336 A1 | 12/2004 | Logan et al. |
| 2004/0261114 A1 | 12/2004 | Addington et al. |
| 2004/0261116 A1 | 12/2004 | McKeown et al. |
| 2004/0267880 A1 | 12/2004 | Patiejunas |
| 2004/0267965 A1 | 12/2004 | Vasudevan et al. |
| 2005/0010697 A1 | 1/2005 | Kinawi et al. |
| 2005/0034171 A1 | 2/2005 | Benya |
| 2005/0039205 A1 | 2/2005 | Riedl |
| 2005/0039206 A1 | 2/2005 | Opdycke |
| 2005/0041679 A1 | 2/2005 | Weinstein et al. |
| 2005/0047596 A1 | 3/2005 | Suzuki |
| 2005/0050160 A1 | 3/2005 | Upendran et al. |
| 2005/0055685 A1 | 3/2005 | Maynard et al. |
| 2005/0058115 A1 | 3/2005 | Levin et al. |
| 2005/0060742 A1 | 3/2005 | Riedl et al. |
| 2005/0060745 A1 | 3/2005 | Riedl et al. |
| 2005/0060758 A1 | 3/2005 | Park |
| 2005/0071669 A1 | 3/2005 | Medvinsky |
| 2005/0071882 A1 | 3/2005 | Rodriguez et al. |
| 2005/0076092 A1 | 4/2005 | Chang et al. |
| 2005/0086691 A1 | 4/2005 | Dudkiewicz et al. |
| 2005/0097598 A1 | 5/2005 | Pedlow et al. |
| 2005/0108529 A1 | 5/2005 | Juneau |
| 2005/0108768 A1 | 5/2005 | Deshpande et al. |
| 2005/0108769 A1 | 5/2005 | Arnold et al. |
| 2005/0111844 A1 | 5/2005 | Compton et al. |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0125528 A1 | 6/2005 | Burke et al. |
| 2005/0125832 A1 | 6/2005 | Jost et al. |
| 2005/0135476 A1 | 6/2005 | Gentric et al. |
| 2005/0152397 A1 | 7/2005 | Bai et al. |
| 2005/0168323 A1 | 8/2005 | Lenoir et al. |
| 2005/0198686 A1 | 9/2005 | Krause et al. |
| 2005/0210510 A1 | 9/2005 | Danker |
| 2005/0223409 A1 | 10/2005 | Rautila et al. |
| 2005/0276284 A1 | 12/2005 | Krause et al. |
| 2005/0283818 A1 | 12/2005 | Zimmermann et al. |
| 2005/0289618 A1 | 12/2005 | Hardin |
| 2005/0289619 A1 | 12/2005 | Melby |
| 2006/0010075 A1 | 1/2006 | Wolf |
| 2006/0020984 A1 | 1/2006 | Ban et al. |
| 2006/0036750 A1 | 2/2006 | Ladd et al. |
| 2006/0037060 A1 | 2/2006 | Simms et al. |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0066632 A1 | 3/2006 | Wong et al. |
| 2006/0073843 A1 | 4/2006 | Aerrabotu et al. |
| 2006/0075449 A1 | 4/2006 | Jagadeesan et al. |
| 2006/0080408 A1 | 4/2006 | Istvan et al. |
| 2006/0084417 A1 | 4/2006 | Melpignano et al. |
| 2006/0085824 A1 | 4/2006 | Bruck et al. |
| 2006/0088063 A1 | 4/2006 | Hartung et al. |
| 2006/0117374 A1 | 6/2006 | Kortum et al. |
| 2006/0127039 A1 | 6/2006 | van Stam |
| 2006/0130107 A1* | 6/2006 | Gonder ............. H04L 29/06027 725/110 |
| 2006/0130113 A1 | 6/2006 | Carlucci et al. |
| 2006/0133398 A1 | 6/2006 | Choi et al. |
| 2006/0133644 A1 | 6/2006 | Wells et al. |
| 2006/0140584 A1 | 6/2006 | Ellis et al. |
| 2006/0171390 A1 | 8/2006 | La Joie |
| 2006/0171423 A1 | 8/2006 | Helms et al. |
| 2006/0173783 A1 | 8/2006 | Marples et al. |
| 2006/0197828 A1 | 9/2006 | Zeng et al. |
| 2006/0212906 A1 | 9/2006 | Cantalini |
| 2006/0218601 A1 | 9/2006 | Michel |
| 2006/0218604 A1 | 9/2006 | Riedl et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0256376 A1 | 11/2006 | Hirooka |
| 2006/0271946 A1 | 11/2006 | Woundy et al. |
| 2006/0277569 A1 | 12/2006 | Smith |
| 2006/0291506 A1 | 12/2006 | Cain |
| 2006/0294250 A1 | 12/2006 | Stone et al. |
| 2007/0022459 A1* | 1/2007 | Gaebel, Jr. ............. H04N 7/165 725/114 |
| 2007/0033531 A1 | 2/2007 | Marsh |
| 2007/0047449 A1 | 3/2007 | Berger et al. |
| 2007/0053293 A1 | 3/2007 | McDonald et al. |
| 2007/0061818 A1 | 3/2007 | Williams et al. |
| 2007/0076728 A1 | 4/2007 | Rieger et al. |
| 2007/0078910 A1 | 4/2007 | Bopardikar |
| 2007/0089127 A1 | 4/2007 | Flickinger et al. |
| 2007/0094691 A1 | 4/2007 | Gazdzinski |
| 2007/0101157 A1 | 5/2007 | Faria |
| 2007/0101370 A1 | 5/2007 | Calderwood |
| 2007/0104456 A1 | 5/2007 | Craner |
| 2007/0106805 A1 | 5/2007 | Marples et al. |
| 2007/0113243 A1 | 5/2007 | Brey |
| 2007/0118852 A1 | 5/2007 | Calderwood |
| 2007/0121569 A1 | 5/2007 | Fukui et al. |
| 2007/0121678 A1 | 5/2007 | Brooks et al. |
| 2007/0124416 A1 | 5/2007 | Casey et al. |
| 2007/0124781 A1 | 5/2007 | Casey et al. |
| 2007/0130581 A1 | 6/2007 | Del Sesto et al. |
| 2007/0133405 A1 | 6/2007 | Bowra et al. |
| 2007/0153820 A1 | 7/2007 | Gould |
| 2007/0156539 A1 | 7/2007 | Yates |
| 2007/0157234 A1 | 7/2007 | Walker |
| 2007/0162927 A1 | 7/2007 | Ramaswamy et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204313 A1 | 8/2007 | McEnroe et al. |
| 2007/0204314 A1 | 8/2007 | Hasek et al. |
| 2007/0217436 A1 | 9/2007 | Markley et al. |
| 2007/0223380 A1 | 9/2007 | Gilbert et al. |
| 2007/0233857 A1 | 10/2007 | Cheng et al. |
| 2007/0241176 A1 | 10/2007 | Epstein et al. |
| 2007/0250872 A1* | 10/2007 | Dua .................... H04N 7/163 725/81 |
| 2007/0250880 A1 | 10/2007 | Hainline |
| 2007/0271386 A1 | 11/2007 | Kurihara et al. |
| 2007/0274400 A1 | 11/2007 | Murai et al. |
| 2007/0276925 A1 | 11/2007 | La Joie et al. |
| 2007/0276926 A1 | 11/2007 | Lajoie et al. |
| 2008/0016526 A1 | 1/2008 | Asmussen |
| 2008/0022012 A1 | 1/2008 | Wang |

(56) References Cited

U.S. PATENT DOCUMENTS

| | | |
|---|---|---|
| 2008/0040403 A1 | 2/2008 | Hayashi |
| 2008/0052157 A1 | 2/2008 | Kadambi et al. |
| 2008/0066112 A1* | 3/2008 | Bailey ............ H04N 5/765 |
| | | 725/58 |
| 2008/0092181 A1 | 4/2008 | Britt |
| 2008/0098212 A1 | 4/2008 | Helms et al. |
| 2008/0098446 A1 | 4/2008 | Seckin et al. |
| 2008/0101460 A1 | 5/2008 | Rodriguez |
| 2008/0112405 A1 | 5/2008 | Cholas et al. |
| 2008/0134165 A1 | 6/2008 | Anderson et al. |
| 2008/0134615 A1 | 6/2008 | Risi et al. |
| 2008/0141175 A1 | 6/2008 | Sarna et al. |
| 2008/0141317 A1 | 6/2008 | Radloff et al. |
| 2008/0152316 A1 | 6/2008 | Sylvain |
| 2008/0155059 A1 | 6/2008 | Hardin et al. |
| 2008/0159714 A1 | 7/2008 | Harrar et al. |
| 2008/0184297 A1 | 7/2008 | Ellis et al. |
| 2008/0134156 A1 | 8/2008 | Osminer et al. |
| 2008/0192820 A1 | 8/2008 | Brooks et al. |
| 2008/0201748 A1 | 8/2008 | Hasek et al. |
| 2008/0209464 A1 | 8/2008 | Wright-Riley |
| 2008/0212947 A1 | 9/2008 | Nesvadba et al. |
| 2008/0229354 A1 | 9/2008 | Morris et al. |
| 2008/0235732 A1 | 9/2008 | Han et al. |
| 2008/0235746 A1 | 9/2008 | Peters et al. |
| 2008/0244667 A1 | 10/2008 | Osborne |
| 2008/0244682 A1 | 10/2008 | Sparrell et al. |
| 2008/0271068 A1 | 10/2008 | Ou et al. |
| 2008/0273591 A1 | 11/2008 | Brooks et al. |
| 2008/0276270 A1 | 11/2008 | Kotaru et al. |
| 2009/0010610 A1 | 1/2009 | Scholl et al. |
| 2009/0019485 A1 | 1/2009 | Ellis et al. |
| 2009/0025027 A1 | 1/2009 | Craner |
| 2009/0028182 A1 | 1/2009 | Brooks et al. |
| 2009/0037960 A1 | 2/2009 | Melby |
| 2009/0052863 A1 | 2/2009 | Parmar et al. |
| 2009/0052870 A1 | 2/2009 | Marsh et al. |
| 2009/0077614 A1 | 3/2009 | White et al. |
| 2009/0083813 A1 | 3/2009 | Dolce et al. |
| 2009/0100182 A1 | 4/2009 | Chaudhry |
| 2009/0100459 A1 | 4/2009 | Riedl et al. |
| 2009/0165053 A1 | 6/2009 | Thyagarajan et al. |
| 2009/0207866 A1 | 8/2009 | Cholas et al. |
| 2009/0210899 A1 | 8/2009 | Lawrence-Apfelbaum et al. |
| 2009/0210912 A1 | 8/2009 | Cholas et al. |
| 2009/0217326 A1 | 8/2009 | Hasek |
| 2009/0217332 A1 | 8/2009 | Hindle et al. |
| 2009/0220216 A1 | 9/2009 | Marsh et al. |
| 2009/0254600 A1 | 10/2009 | Lee et al. |
| 2009/0260042 A1 | 10/2009 | Chiang |
| 2009/0274212 A1 | 11/2009 | Mizutani et al. |
| 2009/0317065 A1 | 12/2009 | Fyock et al. |
| 2010/0061708 A1 | 3/2010 | Barton |
| 2010/0157928 A1 | 6/2010 | Spinar et al. |
| 2010/0223491 A1 | 9/2010 | Ladd et al. |
| 2010/0247067 A1 | 9/2010 | Gratton |
| 2010/0251289 A1 | 9/2010 | Agarwal et al. |
| 2011/0103374 A1 | 5/2011 | LaJoie et al. |
| 2011/0162007 A1 | 6/2011 | Karaoguz et al. |
| 2011/0264530 A1 | 10/2011 | Santangelo et al. |
| 2012/0014255 A1 | 1/2012 | Svedberg |
| 2012/0210382 A1 | 8/2012 | Walker et al. |
| 2012/0278841 A1 | 11/2012 | Hasek et al. |
| 2013/0227608 A1 | 8/2013 | Evans et al. |
| 2013/0325870 A1 | 12/2013 | Rouse et al. |
| 2014/0189749 A1 | 7/2014 | Gordon et al. |
| 2015/0271541 A1 | 9/2015 | Gonder et al. |
| 2015/0324379 A1 | 11/2015 | Danovitz et al. |
| 2016/0307596 A1 | 10/2016 | Hardin et al. |
| 2018/0131975 A1 | 5/2018 | Badawiyeh et al. |

FOREIGN PATENT DOCUMENTS

| | | |
|---|---|---|
| WO | WO-0110125 A1 | 2/2001 |
| WO | WO-0176236 A1 | 10/2001 |
| WO | WO-0191474 A2 | 11/2001 |
| WO | WO-0219581 A1 | 3/2002 |
| WO | WO-2004008693 A1 | 1/2004 |

OTHER PUBLICATIONS

Griffith, et al.,Resource Planning and Bandwidth Allocation in Hybrid Fiber-Coax Residential Networks, National Institute of Standards and Technology (NIST), 10 pages, no date.

Kanouff, Communications Technology: Next-Generation Bandwidth Management—The Evolution of the Anything-to-Anywhere Network, 8 pages, Apr. 1, 2004.

Motorola DOCSIS Cable Module DCM 2000 specifications, 4 pages, no date.

OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).

OpenVision Session Resource Manager features and information, 2 pages, no date, (http://www.imake.com/hopenvision).

Wikipedia, Digital Video Recorder, obtained from the Internet Nov. 11, 2014.

CableLabs Asset Distribution Interface (ADI) Specification, Version 1 1, MD-SP-ADI1.103-040107, Jan. 7, 2004. pp. 1-26.

Deering et al., Internet Protocol, Version 6 (Ipv6) Specification, IETF RFC 2460 (Dec. 1998).

DOCSIS 1.0: Cable Modem to Customer Premise Equipment Interface Specification, dated Nov. 3, 2008, 64 pages.

DOCSIS 1.1: Operations Support System Interface Specification, dated Sep. 6, 2005, 242 pages.

DOCSIS 1.1: Radio Frequency Interface Specification, dated Sep. 6, 2005, 436 pages.

DOCSIS 2.0: Radio Frequency Interface Specification, dated Apr. 21, 2009, 499 pages.

DOCSIS 3.0: Cable Modem to CPE Interface Specification, dated May 9, 2017, 19 pages.

DOCSIS 3.0: MAC and Upper Layer Protocols Interface Specification, dated Jan. 10, 2017, 795 pages.

DOCSIS 3.0: Operations Support System Interface Specification, dated Jan. 10, 2017, 547 pages.

DOCSIS 3.0: Physical Layer Specification, dated Jan. 10, 2017, 184 pages.

DOCSIS 3.1: Cable Modem Operations Support System Interface Specification, dated May 9, 2017, 308 pages.

DOCSIS 3.1: CCAP Operations Support System Interface Specification, dated May 9, 2017, 703 pages.

DOCSIS 3.1: MAC and Upper Layer Protocols Interface Specification, dated May 9, 2017, 838 pages.

DOCSIS 3.1: Physical Layer Specification, dated May 9, 2017, 249 pages.

Internet Protocol DARPA Internet Program Protocol Specification, IETF RFC 791 (Sep. 1981).

SCTE 130-1 2008 Digital Program Insertion—Advertising Systems Interfaces standards.

SCTE 130-1 2013. Part 1: Digital Program Insertion—Advertising Systems Interfaces, Part 1—Advertising Systems Overview, 20 pages.

SCTE 130-10 2013: Digital Program Insertion—Advertising Systems Interfaces Part 10—Stream Restriction Data Model.

SCTE 130-2 2008a: Digital Program Insertion—Advertising Systems Interfaces Part 2—Core Data Elements;.

SCTE 130-2 2014 Digital Program Insertion—Advertising Systems Interfaces standards.

SCTE 130-3 2013: Digital Program Insertion—Advertising Systems Interfaces Part 3—Ad Management Service Interface;.

SCTE 130-4 2009: Digital Program Insertion—Advertising Systems Interfaces Part 4—Content Information Service;.

(56) References Cited

OTHER PUBLICATIONS

SCTE 130-5 2010: Digital Program Insertion—Advertising Systems Interfaces Part 5—Placement Opportunity Information Service;.
SCTE 130-6 2010: Digital Program Insertion—Advertising Systems Interfaces Part 6—Subscriber Information Service;.
SCTE 130-7 2009: Digital Program Insertion—Advertising Systems Interfaces Part 7—Message Transport;.
SCTE 130-8 2010a: Digital Program Insertion Advertising Systems Interfaces Part 8—General Information Service;.
SCTE 130-9 2014: Recommended Practices for SCTE 130 Digital Program Insertion—Advertising Systems Interfaces;.
SCTE130-3 2010: Digital Program Insertion—Advertising Systems Interfaces Part 3—Ad Management Service Interface;.

* cited by examiner

METHODS AND APPARATUS FOR CONTENT DELIVERY AND REPLACEMENT IN A NETWORK

This application is a continuation of and claims priority to co-owned U.S. patent application Ser. No. 11/726,095, of the same title filed on Mar. 20, 2007, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content or data delivery over a network, and in one exemplary aspect to using peer devices to provide content over a cable television network.

2. Description of Related Technology

Content-based networks (e.g., cable television, satellite, etc.) are well known in the prior art. Such networks typically utilize one or more substantially centralized distribution nodes (e.g., a cable system headend) and a wireline, optical, and or wireless delivery infrastructure which permits distribution of content from the central node to a plurality of client or customer premises devices via e.g., a plurality of radio frequency (RF) channels or QAMs (so-called "downstream" delivery).

Additionally, such networks may be configured to provide high-speed or broadband Internet access, such as via a cable modem that operates on ancillary or secondary RF channels in addition to those used for the "in-band" content delivery. Some upstream (client-to-network) connectivity is also provided, primarily for (i) signaling or messaging between the client devices and the network servers or entities; and (ii) broadband access to the Internet (via the aforementioned cable modem or similar channels).

While providing unprecedented capability and features to subscribers (such as VOD or video-on-demand, personal video recorder (PVR), download and recording on the subscribers own device (e.g., DVR), and the like), one salient deficiency still un-addressed in such networks relates to the centralization of the network. Specifically, in the context of an exemplary cable network, the "core" portion of the network can act as somewhat of a bottleneck or limitation on capacity. Specifically, cable infrastructure (including the hybrid-fiber coax or HFC portions) are physically designed to handle only so much subscriber demand. With greater demands being felt for bandwidth intensive services such as VOD, PVR, and high definition (HD) programs (the latter consuming a full four-times the bandwidth of a standard definition program), extant network infrastructure is being stretched increasingly thin.

Interestingly, however, the consumption of capacity or bandwidth within the network is typically not symmetric with respect to (i) location in the network; or (ii) direction of propagation (e.g., upstream or downstream). Specifically, the "edges" of the network (i.e., portions closer to the subscriber premises, or to other external networks and their interfaces) are typically less loaded (or similarly less restricted) than the core. For example, a given distribution hub infrastructure may be able to service all of the existing subscribers simultaneously with high-bandwidth services, yet if all such hubs were to provide such a level of service simultaneously, the core would be unable to meet the demand. Hence, the edges (at least on average) can be considered to have substantial unused capacity within the network.

Similarly, the downstream flow of content typically greatly outweighs any upstream traffic, even when considering cable modems and the like (e.g., DOCSIS upstream broadband traffic).

Another deficiency associated with prior art content-based network infrastructure relates to ephemeral content availability or transmissions. For example for live broadcasts, there may be no headend or other storage of the content. Hence, if a subscriber misses the broadcast (or a portion thereof), they have little recourse in obtaining the content. This is particularly acute for unplanned live broadcasts; e.g., breaking news coverage, etc., since the subscriber (if not home) has little opportunity to record the content, and cannot plan to record it in advance since they have no foreknowledge of the event.

A related disability concerns recovery or reconstitution of content that may be incomplete or may have been corrupted. Even if the subscriber is successful at capturing ephemeral or other content on their client device (e.g., set-top box with DVR), it may not be whole (e.g., they may have missed the first ten minutes because they were late, or the last ten minutes because the network imposed a scheduling change, etc.), or alternatively it may have been corrupted such as via natural phenomenon (sunspots or radio frequency interference), service interruptions, subscriber error, or any other of a host of possible causes. Other types of content such as computer files or applications, gaming content, etc. may simply be incompatible or improperly configured for the subscriber's platform (e.g., improper codec, infected with mal-ware or virus, calls to deprecated or non-functional APIs in the code, etc.). The user's storage device may even be to blame, such as where one or more bad disk sectors or cylinders exist.

Peer-To-Peer (P2P) Technology—

Distributed (e.g., peer-to-peer, or "P2P") networks and protocols have incrementally improved over time in both technological advancement and prevalence, and currently allow network users (such as users of the Internet) to readily gain access to a variety of different types of content including music, video, images, and data.

The implementation of P2P networks and environments are well known in the prior art, including those such as for example Gnutella, Morpheus, Kazaa, Freenet, and E-Donkey. Exemplary P2P architectures and associated components are described in detail in, inter alia, U.S. Pat. No. 6,219,710 to Gray, et al. issued Apr. 17, 2001 and entitled "Method and apparatus for peer-to-peer communication"; U.S. Pat. No. 6,167,432 to Jiang issued Dec. 26, 2000 and entitled, "Method for creating peer-to-peer connections over an interconnected network to facilitate conferencing among users"; United States Patent Application 20020162109A1 to Shteyn published Oct. 31, 2002, entitled "Distributed storage on a P2P network architecture"; United States Patent Application 20020152299A1 to Traversat, et al. published Oct. 17, 2002 and entitled "Reliable peer-to-peer connections"; and United States Patent Application 20020147771A1 to Traversat, et al. published Oct. 10, 2002 and entitled "Peer-to-peer computing architecture", each of the foregoing which is incorporated herein by reference in its entirety.

"Pure" P2P architectures have the advantage of having no central server or other component, making communication and packet/file sharing between peer clients fluid and decentralized, and avoiding issues associated with maintaining a central server. Decentralized and unstructured peer-to-peer networks are attractive for certain applications because they require no centralized directories and no precise control over network topology or data placement. P2P systems are also inherently fault-tolerant.

When peer-to-peer file sharing was first introduced, it rapidly gained popularity due to inter alia ease of use, convenience, ready access to content, and cost benefits. However, many P2P technologies are not well suited to enforce quality-of-service (QoS), authentication, bandwidth management, or digital rights management (DRM)/copyright protection policies on shared files or content. As peer-to-peer networks and protocols evolved and improved in recent years, users have begun to expect more from the technology; i.e., a more immediate, transparent, secure, error-free, and even anonymous file or data sharing experience.

One such example of a recent P2P protocol aimed at addressing many of the foregoing needs is the BitTorrent™ protocol. BitTorrent comprises a protocol designed for transferring files in a P2P network. In a BitTorrent P2P network, users connect to each other directly as peers (as opposed to via a server or other such content-serving entity) in order to send and receive files or portions of files. The BitTorrent architecture does utilize at least one server however, known as a "tracker", which coordinates the actions of related nodes on a network. The tracker (server) only manages connections between nodes, and can therefore be supported with limited bandwidth. Alternatively, network nodes are dynamically and directly connected with each other and require added bandwidth to transfer files during file exchange. Peer exchange (PEX) is another method to gather network nodes for BitTorrent in addition to trackers and Distributed Hash Table (DHT).

BitTorrent clients are programs which implement the BitTorrent protocol. There are numerous compatible clients, written in a variety of programming languages, and running on a variety of computing platforms. Each BitTorrent client is capable of preparing, requesting, and transmitting any type of computer file over a network using the BitTorrent protocol. BitTorrent clients support encryption capabilities. Protocol header encrypt (PHE), Message stream encryption (MSE), or Protocol encryption (PE) are features of some BitTorrent clients. Encryption makes BitTorrent traffic harder to detect in a network. Another proposed feature of the BitTorrent clients combines RSS and BitTorrent to create a content delivery system dubbed broadcatching.

The process of downloading a "torrent" and exchanging files utilizing the BitTorrent protocol is as described as follows.

A user conducts a query on the web and selects a specific torrent to download, a small "- - - .torrent" file is selected. Opening this file with a BitTorrent client program is the first step in the download. The client then connects to the tracker, which provides it with a list of clients currently downloading the file or files. A group of peers on a BitTorrent or P2P connected with each other to share a particular torrent.

Initially, there may be no other nodes also requesting the same content, in which case the client connects directly to the content source and begins to request pieces. The BitTorrent protocol breaks down files into a number of smaller pieces. Pieces are checked as they are received using a hash algorithm to ensure that they are error-free. Peers that provide the complete file are referred to as "seeders", and the peer providing the initial copy is known as the initial seeder.

As more and more nodes enter and request for the same content, the nodes begin trading pieces with one another, instead of downloading directly from the original source. BitTorrent clients incorporate mechanisms to optimize download and upload rates. Nodes download pieces in a random order, so as to increase the opportunity to exchange data. This is only possible if two peers have a different subset of the target content (file).

The effectiveness of the peer-to-peer data exchange of BitTorrent depends to a large degree on the policies used by clients to determine to whom to send data; more restrictive policies tend to reduce efficiency.

Based on the foregoing, a need exists for an improved approach to content distribution within a network (e.g., a cable television network) that allows for utilization of capacity further out toward the network's edge. Such improved apparatus and methods would also ideally give subscribers to the ability to readily obtain ephemeral or other content which they missed or otherwise do not possess, and reconstitute damaged or missing portions of content without having to further burden the network core. Moreover, such apparatus and methods could be implemented readily within the existing framework of a network, without significant modifications to infrastructure or client devices (e.g., set-top boxes).

SUMMARY OF THE INVENTION

The present invention satisfies the foregoing needs by providing improved apparatus and methods for acquiring or delivering content within a network.

In a first aspect of the invention, a peer-to-peer software architecture is disclosed. In one embodiment, the architecture is adapted for the delivery and reconstitution of content among a plurality of peer client devices within a cable network, and comprises: a first software process disposed on a first of the plurality of peer client devices and configured to evaluate at least a portion of content received at the first client device; and a second software process disposed on a first client device and in communication with the first process. The second process is configured to: receive information relating to one or more content elements associated with the at least portion which require reconstitution; communicate with respective software processes on at least one other of the plurality of devices to obtain uncorrupted ones of the one or more content elements; and receive the one or more content elements from the at least one other of the plurality of devices.

In one variant, the architecture further comprises a third process adapted to utilize the received uncorrupted ones of the one or more elements to reconstitute the content.

In another variant, the evaluation by first process comprises a cyclic redundancy check (CRC) or checksum analysis of data comprising the at least portion.

In still another variant, the first client device is adapted to communicate with a third process disposed on a network entity (e.g., network hub or node) substantially remote from the first device, the third process adapted to control at least one aspect of the operation of the first or second processes.

In yet another variant, the content is received over the network at the first device via a streaming protocol, and the evaluation is conducted substantially in real time. The content comprises e.g., a stream of MPEG2 encoded packets disposed within a transport multiplex, the packets being buffered upon receipt, and the evaluation is performed on at least a portion of the packets.

In another variant, the first process is adapted to, before the content is enabled for access: perform the evaluation; and cause the second process to perform the communication with respective software processes on others of the plurality of devices to obtain the uncorrupted ones of the one or more content elements.

In another variant, the first process is adapted to: perform the evaluation of the at least portion in advance of playback thereof; cause the second process to obtain the uncorrupted ones of the one or more content elements; and reconstitute the one or more elements using the uncorrupted ones of the elements at least in time for the playback.

In still another variant, the availability of the content via the first client device is delayed for at least a period of time until the one or more elements of the content requiring reconstitution have been reconstituted; and a notification of the delay is sent to or displayed for a user.

In another embodiment, the software architecture is adapted to facilitate peer-to-peer delivery of content, the architecture comprising: a first process associated with the server; and second processes disposed on respective ones of at least a portion of the plurality of client devices. The first process is adapted to facilitate identification of one or more of the at least portion of the plurality of client devices that can service at least a portion of a request for content issued by at least one of the at least portion of the plurality of client devices using content that is substantially indigenous to the one or more devices.

In one variant, the network comprises a broadcast switched architecture (BSA) network, and the request comprises a request for substantially ephemeral content that was broadcast over the BSA network.

In another variant, the first process does not receive or distribute any of the requested content.

In still another variant, one of the client devices is adapted to instantiate an on-demand session for delivery of content to another of the client devices.

In yet another variant, the first process is further adapted to cause the one or more client devices to provide different portions of the requested content to the at least one requesting device in a substantially simultaneous fashion.

In still another variant, the first process maintains a file (e.g., a .torrent or similar file) that can be accessed by the at least portion of devices having the second process, the file comprising a listing of other devices supporting download of the requested content.

In another variant, the second processes are adapted to encrypt, and the first process decrypt, at least a portion of the requested content. The encryption and decryption are performed using at least one public-private key pair.

In another variant, the request for content comprises a request for at least a portion of a downloadable conditional access (DCAS) module or image.

In still another variant, the software architecture further comprises a third process disposed on respective ones of at least a portion of the plurality of client devices adapted to authenticate others of the plurality of client devices before transferring any of the requested content thereto. The third process may further be adapted to communicate with a RADIUS server as part of the authentication and/or authenticate the others of the client devices according to IEEE-Std. 802.1x.

In a second aspect of the invention, customer premises equipment (CPE) adapted for peer-based content delivery within a content-based network is disclosed. In one embodiment, the CPE comprises: a processor; a network interface; a storage device in data communication with at least one of the processor or interface; and a software process operative to run on the processor. The software process is configured to: receive information from an external entity relating to a request for content; identify content stored on the storage device that can at least in part satisfy the request; and transmit the identified stored content to a network device via the interface.

In one variant, the network comprises a cable television network, and the CPE comprises an OCAP (OpenCable) compliant set-top box having at least one tuner, demodulator, and middleware. The network interface comprises e.g., a DOCSIS upstream interface.

In another variant, the software process comprises a client application downloaded to the CPE over the cable network via the at least one tuner.

In yet another variant, the external entity and the network device comprise the same physical device; e.g., the physical device comprises another customer premises equipment (CPE) adapted for peer-based content delivery within the content-based network.

In still another variant, the CPE comprises a secure microprocessor (SM), and the content requested comprises at least a portion of a downloadable conditional access (DCAS) module or image.

In yet another variant, the receipt of information from an external entity, the identification of content stored on the storage device that can at least in part satisfy the request, and the transmission of the identified stored content to a network device via the interface is performed within a time frame that permits real time streaming of content at the network device.

In another embodiment, the CPE comprises: a processor; a network interface; a storage device in data communication with at least one of the processor or interface, the storage device having content stored thereon; and a software process operative to run on the processor; wherein the software process is configured to: evaluate at least a portion of the stored content; issue a request for content based at least in part on the evaluation; and receive the requested content via the interface.

In one variant, the evaluation comprises identifying one or more missing portions or elements of the stored content.

In another variant, the request is issued to a server or tracking process, and the requested content is received from another CPE within the same network.

In a third aspect of the invention, apparatus for use in a network is disclosed. In one embodiment, the network comprises a cable network having a plurality of client devices with associated client software processes, and the apparatus comprises: a processor; a storage device in data communication with the processor; a network interface adapted to transmit and receive communications with the plurality of client devices; and a software process adapted to run on the apparatus. The software process is configured to: receive requests for content to download to one or more of the client devices; and facilitate providing the content from at least one of the client devices to the one or more devices over a local distribution portion of the cable network.

In one variant, the apparatus comprises a server disposed at a distribution or switching node of the cable network.

In another variant, the facilitating providing the content comprises causing the at least one client device to transmit the content: (i) via an upstream cable modem channel; and subsequently (ii) via a downstream in-band channel.

In another variant, the facilitating providing the content comprises causing the at least one client device to transmit the content: (i) via an upstream out-of-band (OOB) channel; and subsequently (ii) via a downstream in-band channel.

In a fourth aspect of the invention, a method of operating a content-based network so as to allow for peer-to-peer delivery of content is disclosed.

In a fifth aspect of the invention, a content-based network having indigenous P2P capability is disclosed.

In a sixth aspect of the invention, a supervisory or tracking process adapted for use within a cable network is disclosed.

In a seventh aspect of the invention, methods of doing business within a content-based network using P2P capability are disclosed.

In an eighth aspect of the invention, a method of reconstituting content is disclosed. In one embodiment, the reconstitution is performed effectively in real-time.

In a ninth aspect of the invention, a security architecture for use in a P2P network is disclosed.

In a tenth aspect of the invention, a method of conserving bandwidth within a network is disclosed. In one embodiment, the method comprises pushing bandwidth consumption out to the fringe or edge regions of a cable television network using e.g., a P2P delivery model, so as to limit loading within the critical core region of the network.

In an eleventh aspect of the invention, apparatus for providing substantially invisible or transparent transcoding, transrating, resolution conversion, or other processing is disclosed. In one embodiment, the apparatus comprises at least one first computer program adapted to generate profiling information relating to a requesting or sink peer, and a server process adapted to receive the profiling information, and select one or more source peers based on the profiling information. The server further coordinates performance of any pre-processing or adjustments (e.g., resolution, bit rate, etc.) necessary to adapt the content of the source peer(s) to the environment of the sink peer without user intervention. In another embodiment, the functions of the server are performed by one or more source peers, who "self-evaluate" the profiling information, and perform any necessary adjustments or preprocessing based thereon.

In a twelfth aspect of the invention, a method of operating a content based network is disclosed. In one embodiment, the method comprises: obtaining profile data from a requesting peer; transmitting the relevant profile information to at least one other network entity; selecting one or more prospective source peers; evaluating the one or more peers for processing requirements; performing or scheduling any necessary processing; and transmitting the requested content to the requesting peer.

In one variant, the other network entity comprises a network server process in communication with the requesting peer and a plurality of prospective source peers.

In another variant, the selecting is performed prior to the transmitting, and the transmitting comprises transmitting to the selected source peers. The act of evaluating is also performed prior to the transmission.

In still another variant, the evaluating comprises identifying any transcoding or transrating requirement based at least in part on the profile data.

In a thirteenth aspect of the disclosure, a customer premises equipment (CPE) configured for peer-based content delivery within a content delivery network is disclosed. In one embodiment, the CPE comprises: a network interface, a storage device, and a processor in data communication with at least one of the storage device and/or the interface, the processor configured to execute a software process comprising a plurality of instructions which are configured to when executed: (i) receive information from an external entity relating to a request for content; (ii) identify the requested content stored on the storage device; (iii) process the requested content to include one or more content protection schemes; and (iv) transmit the processed content to the external entity via the interface.

In a fourteenth aspect of the disclosure, a non-transitory computer readable apparatus having a storage medium containing at least one computer program is disclosed. In one embodiment, the at least one computer program comprises a plurality of instructions which, when executed on a host device, are configured to: (i) receive a request for content from a client device external to the host device, the request comprising information relating to an authorized service domain which the client device is within; (ii) determine whether the authorized service domain which the client device is within comprises an authorized service domain having access to the requested content; and (iii) when it is determined that the authorized service domain has access to the requested content, transmit the processed content from the host device to the client device.

In a fifteenth aspect of the disclosure, a customer premises equipment (CPE) configured for peer-based content delivery within a content delivery network is disclosed. In one embodiment, the CPE comprises: a network interface, a storage device, and a processor in data communication with at least one of the storage device and/or the interface, the processor configured to execute a software process comprising a plurality of instructions which are configured to when executed: (i) evaluate a plurality of content available via peer-based content delivery; (ii) issue a request for an individual one of the plurality of content to one or more of a plurality of peer devices from which the plurality of content is available, the request comprising at least information relating to a security feature of the CPE; and (iii) receive the requested content via the interface, the requested content being transferred thereto securely via the security feature of the CPE.

These and other aspects shall become apparent when considered in light of the disclosure provided below.

BRIEF DESCRIPTION OF THE DRAWINGS

FIG. 3b is a flowchart illustrating one exemplary implementation of the methodology of identifying one or more source candidates from a pool according to the methodology of FIG. 3a.

DETAILED DESCRIPTION OF THE INVENTION

Figure 1:
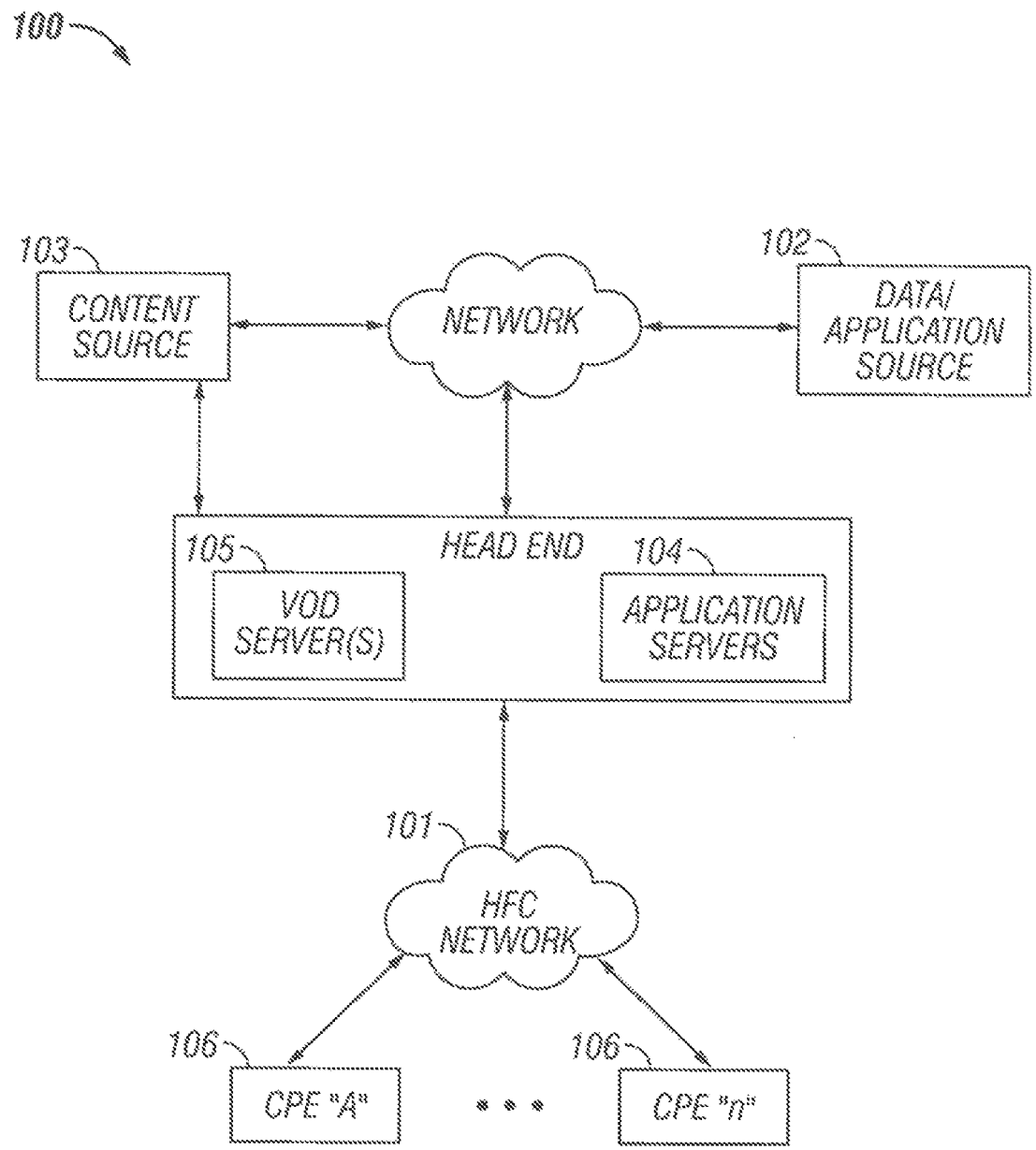
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "boundary" refers to, without limitation, any actual, geographic, logical, or virtual boundary or implementation rule as specified by one or more criteria. For example, a geographic boundary may be specified by one or more postal zip codes, telephone area codes/exchanges, or the like. Alternatively, a logical boundary or rule may be specified by membership in an organization, subscription to a particular service, or the like.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or LG Chocolate or Motorola Blackjack™, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "display element" refers to any user interface (UI) or other structure adapted to be displayed on a display device including without limitation windows, icons, objects, "tickers" or menus.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that customers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

A used herein, the terms "peer-to-peer" and "P2P" refer without limitation to any topology, mechanism or method for transferring information between or among two or more computerized entities, whether with or without the aid of another entity (e.g., server).

As used herein, the term "QAM" refers to modulation schemes used for sending signals over cable networks. Such modulation scheme might use any constellation level (e.g. QPSK, 16QAM, 64QAM, 256QAM, etc.) depending on details of a cable network. A QAM may also refer to a physical channel modulated according to the schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "reconstitution" refers to, without limitation, any repair, replacement, substitution, editing, combining, filtration, error correction, or other process(ing) used to place content in a desired state or condition.

As used herein, the term "server" refers to any computerized component, system or entity regardless of form which is adapted to provide data, files, applications, content, or other services to one or more other devices or entities on a computer network.

As used herein, the terms "source" and "sink" refer generally and without limitation to sources of content (e.g., data, video, audio, multimedia, files, games, cryptographic elements, etc.) and users or requesters of content, respectively.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "trickle download" refers to without limitation any delivery or download mode which is at a rate appreciably less than the maximum capability of the extant network over which the downloaded content is being delivered. For example, one type of trickle download might comprise a slow, substantially constant rate download "in the background" using small amounts of excess primary bandwidth capability. Trickle downloads may programmatic (e.g., predetermined to continue in one session until complete, such as based on a bandwidth reservation), or may also be opportunistic; e.g., conducted in two or more segments as excess capacity becomes available.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for the acquisition, delivery, and reconstitution of content present within the network. These methods and apparatus have as a primary aim improving the "robustness" or capability of the network with respect to ensuring that subscribers or other users can receive and access desired content when they want, and seamlessly repair or reconstitute damaged or missed portions of that content (including even an entire streamed program, broadcast or download).

In one embodiment, a dynamic peer-to-peer (P2P) architecture is used to provide the foregoing functionality. Specifically, one variant of this architecture comprises using customer premises equipment or CPE (e.g., DSTBs or other subscriber premises devices present within a cable television network) to act as peer content providers for one another. This peer relationship may be as simple as one device with certain content (or portions thereof) providing that content to another device. More sophisticated variants of the invention employ the use of multiple source peers (and in some cases multiple requesting or "sink" peers), as controlled by a server process.

The P2P approach described herein has many potential benefits including, for example, the ability to push at least some network bandwidth consumption out to the edge of the network (e.g., hubs or other distribution nodes), thereby conserving bandwidth at the core of the network, the latter which can often be the most critical or bandwidth constrained portion of the system. Moreover, requests outside the MSO network are obviated, thereby conserving resources in this regard. Latency can also be reduced in some cases (e.g., where the network is over-subscribed), since the requested content is acquired and distributed locally versus having to come from the core (or a third-party content source routed through the core or other network infrastructure).

Advantageously, the methods and/or apparatus of the invention may be implemented according to a real-time (or near-real time) paradigm, or alternatively in latent or time-shifted (or event-shifted) fashion. For example, in one variant, streamed content is transmitted downstream to one or more target CPE, which buffer the display or presentation of the content so as to permit (i) identification of corrupted or missing portions of the content; and (ii) obtaining these identified portions transparently from a peer device or other source in a timely enough fashion to permit streaming to continue. In one case, the buffer is set for a prescribed number of frames, packets, or duration "ahead" of the display/presentation, such as where n seconds of content are buffered, n being selected so as to permit identification and acquisition of any replacement or supplemental portions of the content.

Alternatively, the content may be provided according to a download paradigm (for example via high-speed in-band download, DOCSIS download, opportunistic or "trickle" etc.), with the evaluation of the content being performed during or after completion of the download. Content availability or access can be delayed until the content is perfected (i.e., reconstituted).

The present invention advantageously leverages distributed processing power as well, allowing for inter alia, use of "thinner" clients. Since each peer is providing only comparatively small portions of the requested content (which may also be capped or restricted based on that peer's capability), it may not require the same processing, storage, and other capabilities it might require if it were sole-sourcing the requested content.

Improved network server and CPE apparatus capable of implementing the aforementioned acquisition and reconstitution methodologies are also described, as well as mechanisms to implement operational and/or business rules during system operation.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a customer (i.e., home) end user domain, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Network—

FIG. 1 illustrates a typical content-based network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
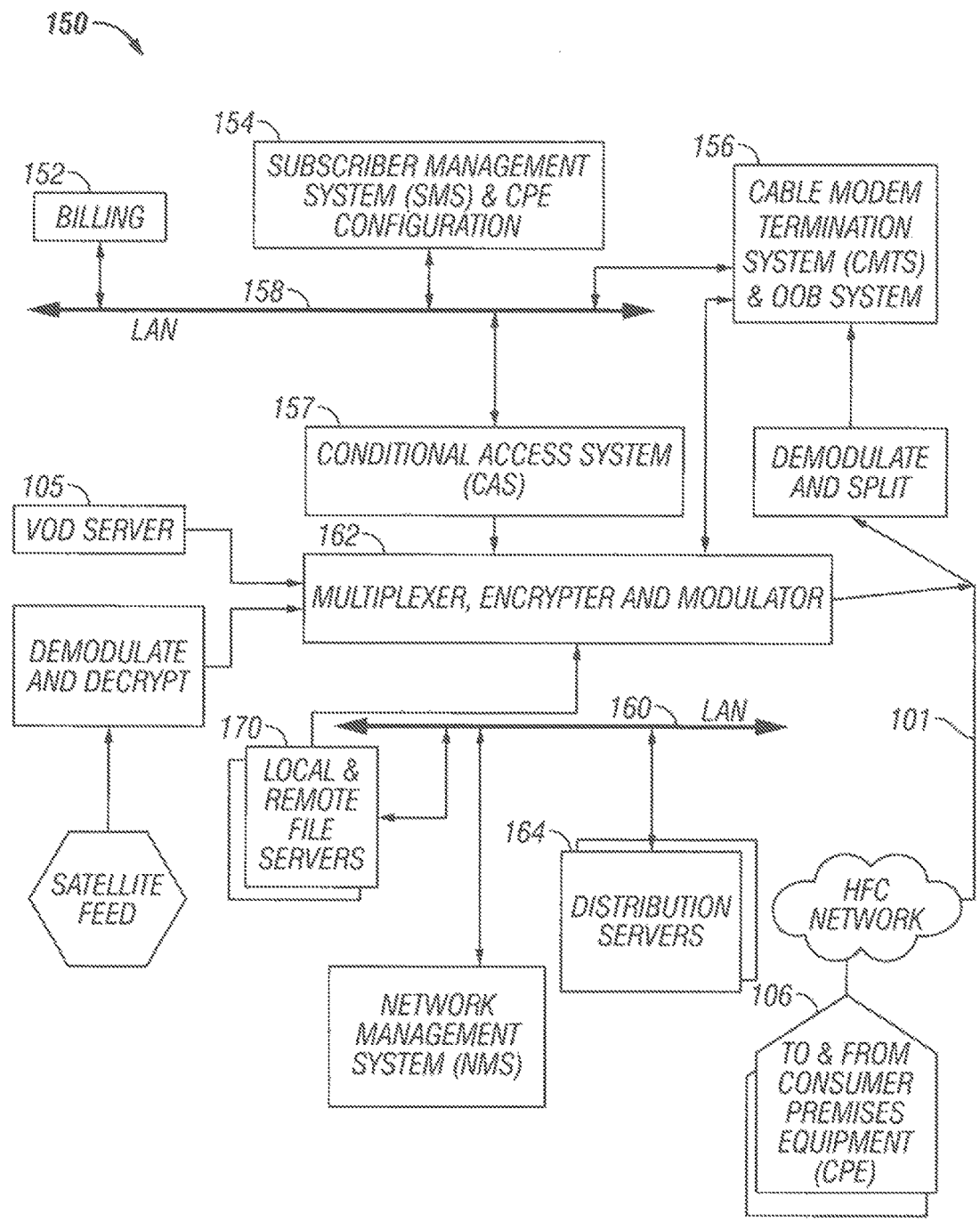
FIG. 1a is a functional block diagram illustrating one exemplary HFC cable network headend configuration useful with the present invention.
Figure 1B:
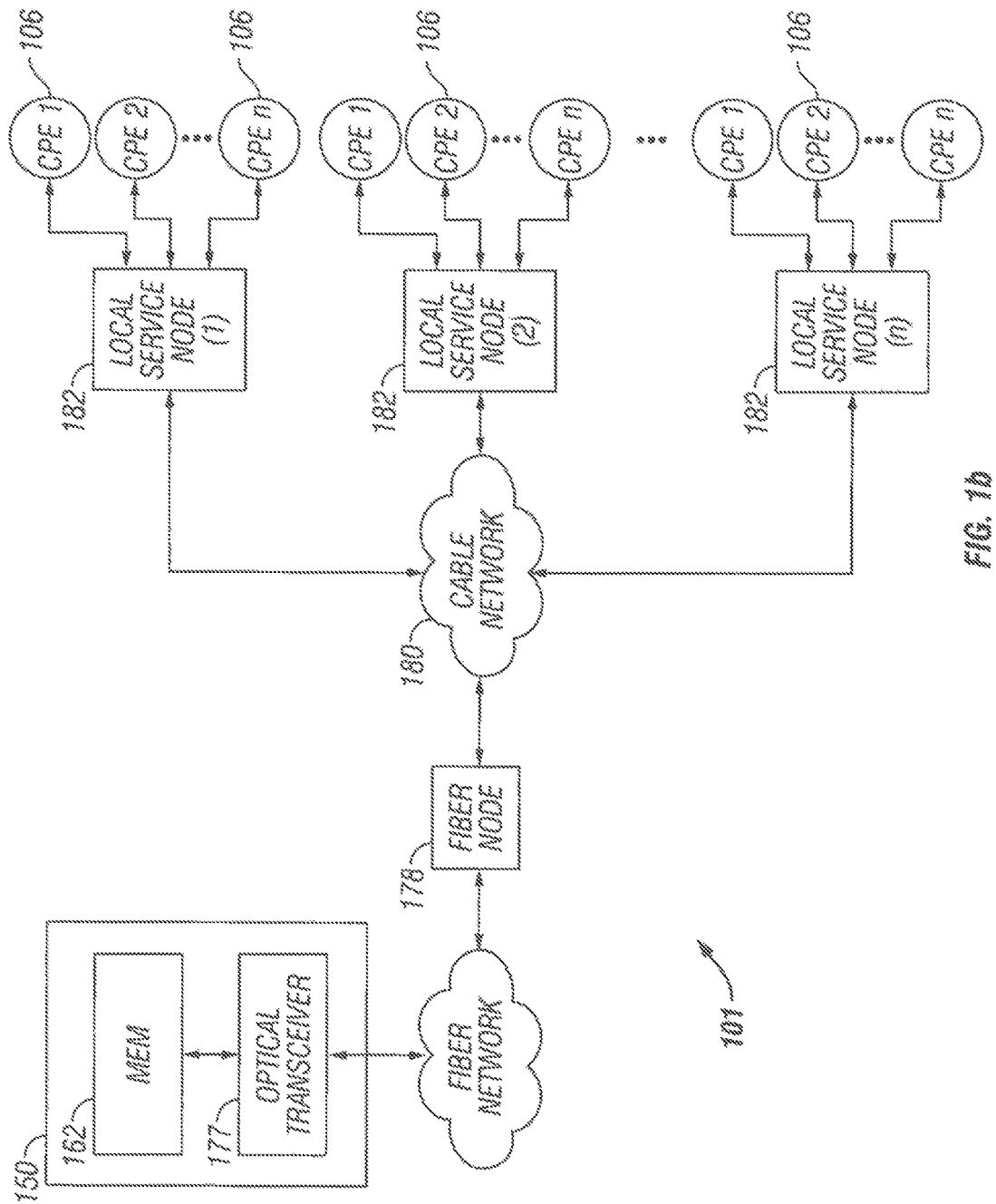
FIG. 1b is a functional block diagram illustrating one exemplary local service node configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

Figure 1C:
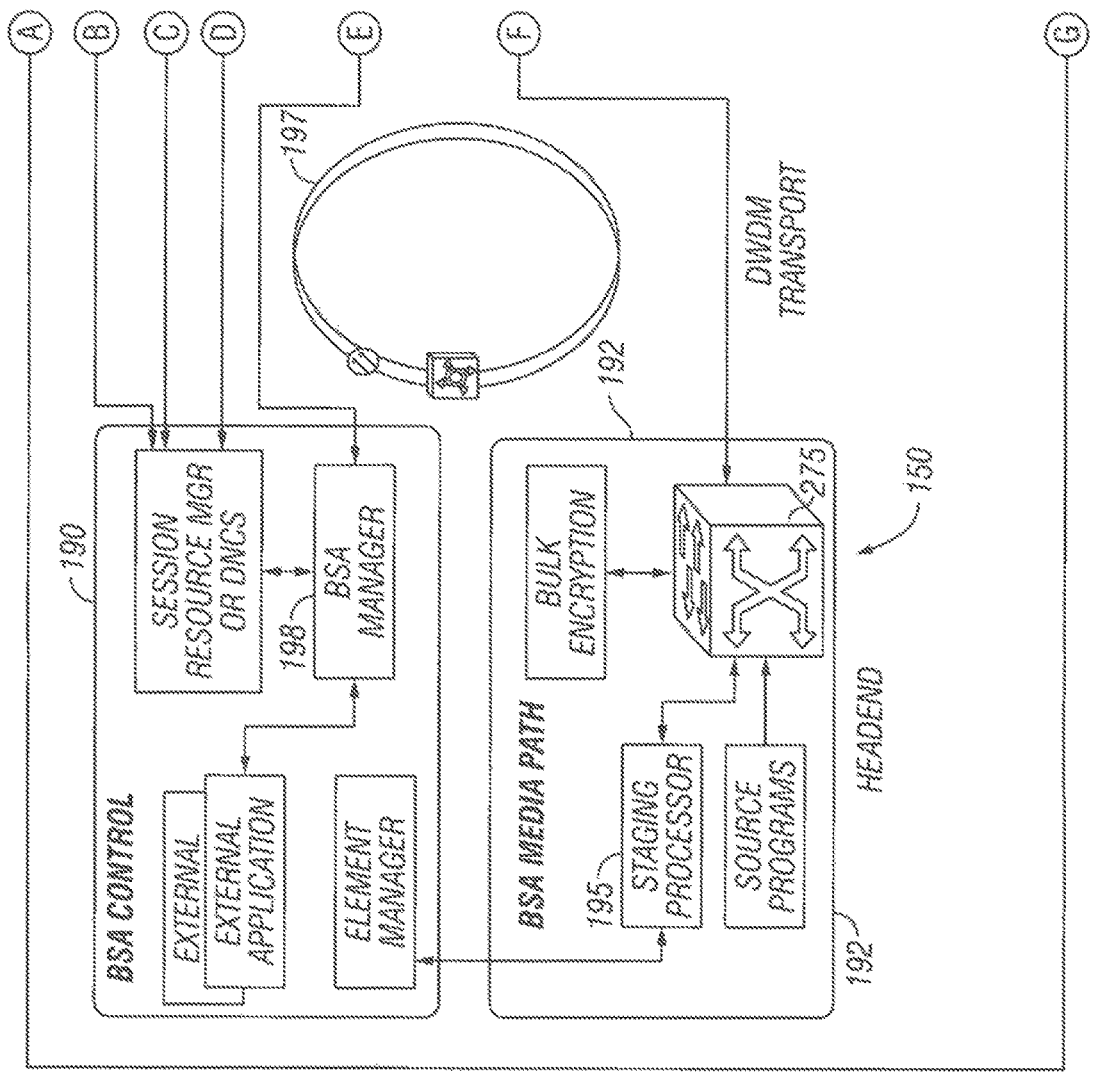
FIG. 1c is a functional block diagram illustrating one exemplary broadcast switched architecture (BSA) network useful with the present invention.
Figure 1C:
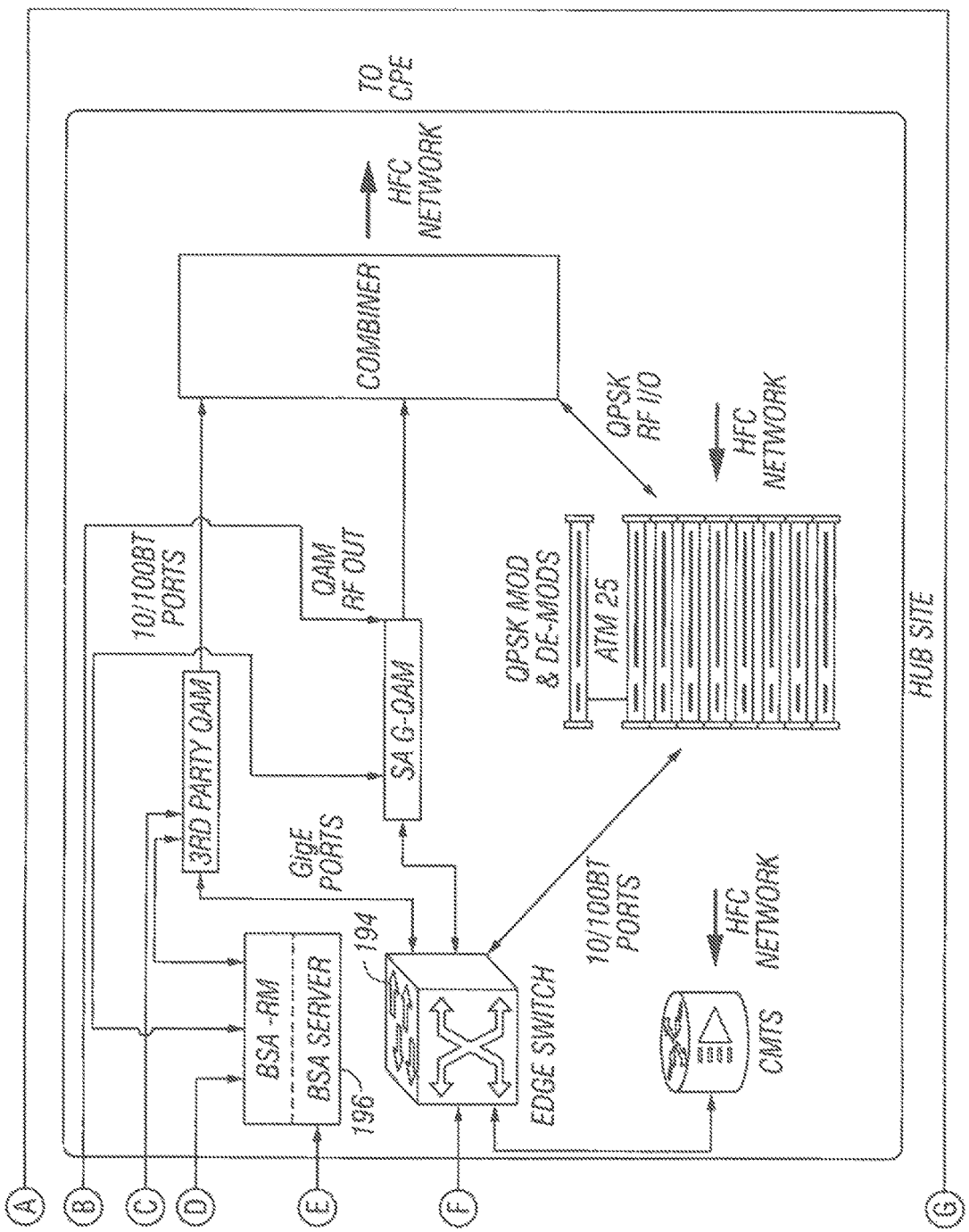

FIG. 1c illustrates an exemplary "switched" network architecture also useful with the content acquisition and/or replacement features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, and entitled "TECHNIQUE FOR EFFECTIVELY PROVIDING PROGRAM MATERIAL IN A CABLE TELEVISION SYSTEM", and issued as U.S. Pat. No. 8,713,623 as Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Methods—

Figure 2:
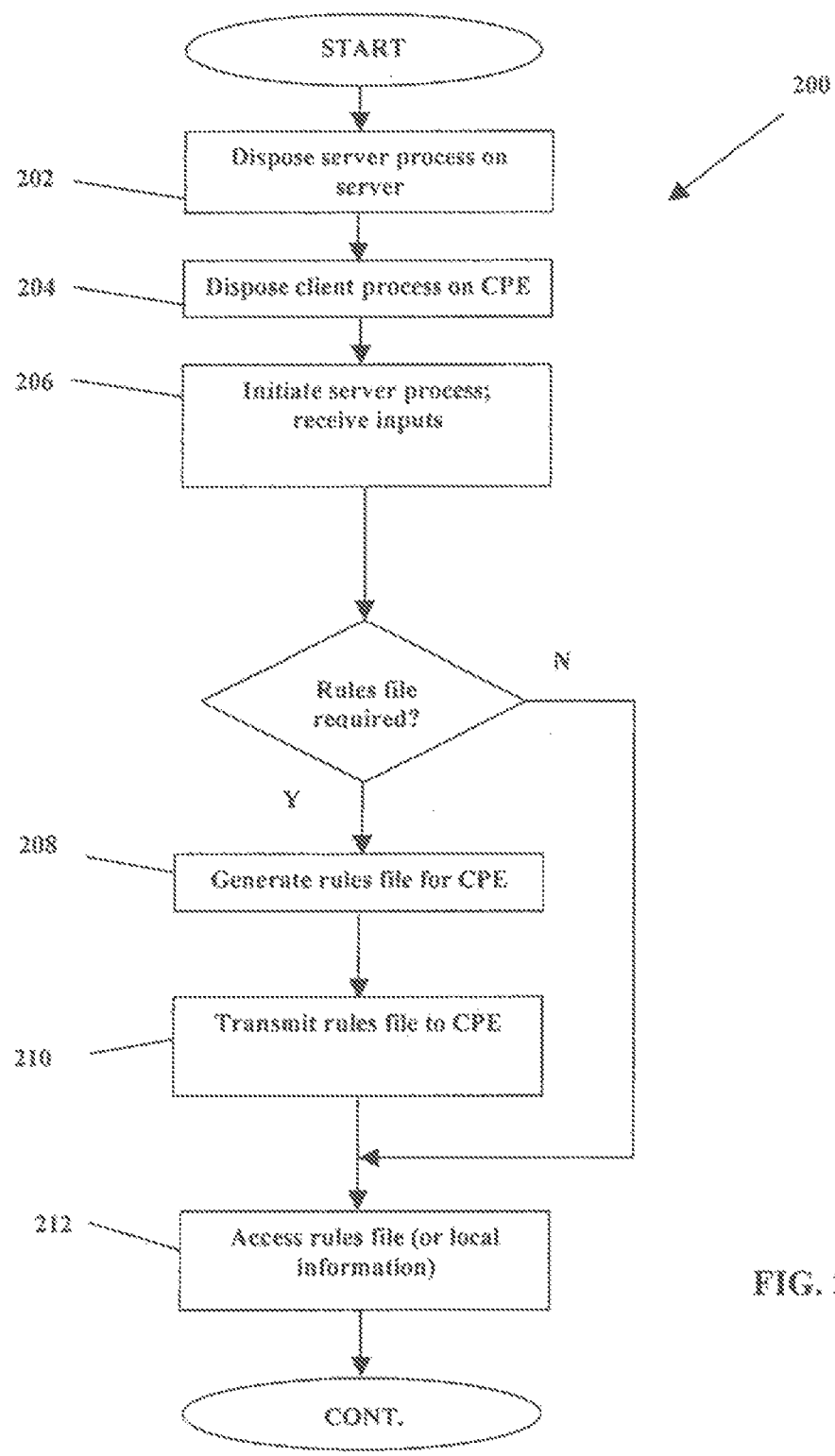
FIG. 2 is a logical flow diagram illustrating one exemplary embodiment of the method of configuring a content-based network with peer-to-peer (P2P) content delivery capability according to the present invention.
Figure 2A:
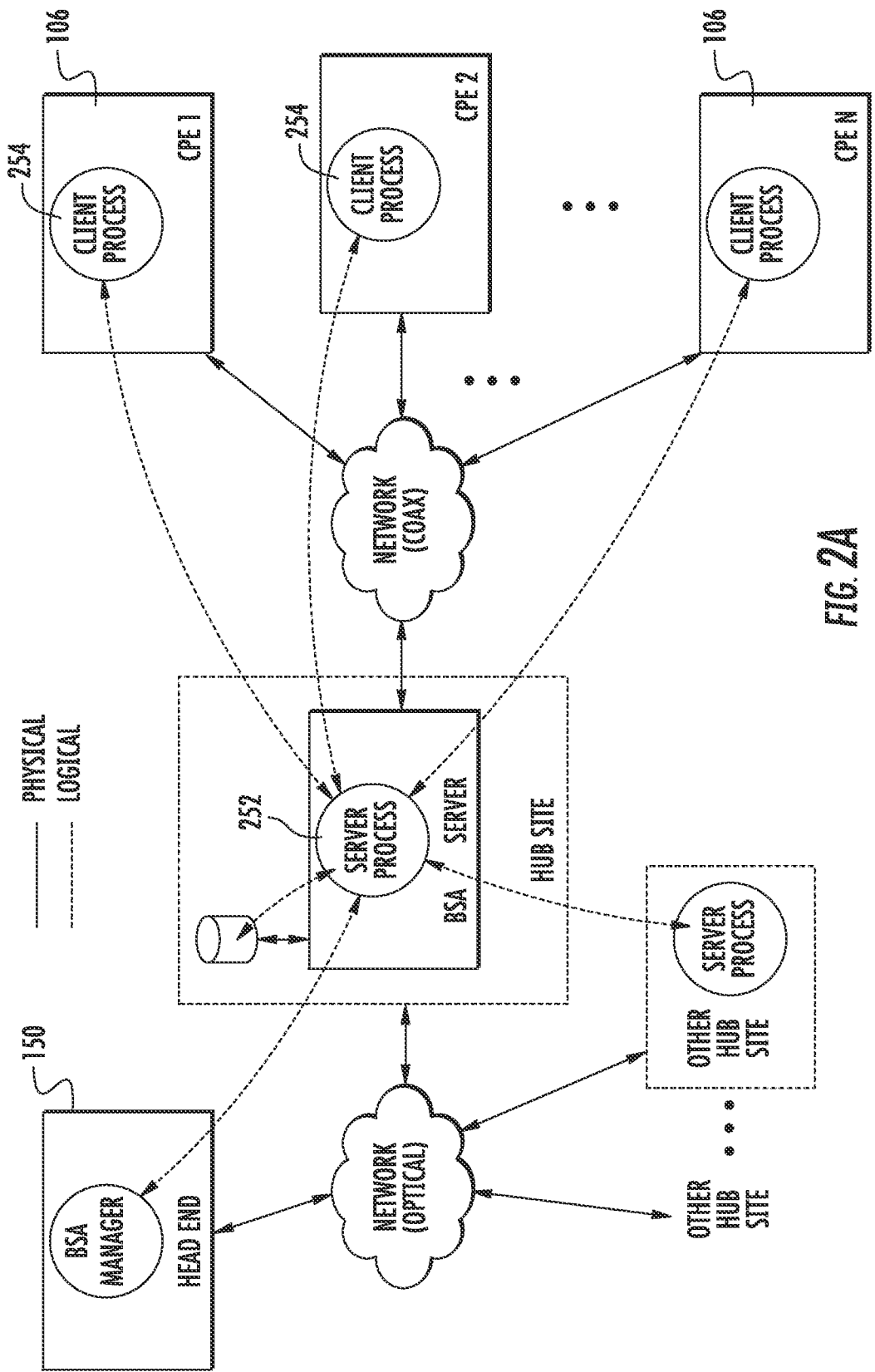
FIG. 2a is a graphical representation of an exemplary hardware/software architecture implementing the functionality of the invention.

Referring now to FIGS. 2-2a, one exemplary embodiment of the method of configuring a content-based network using content acquisition and reconstitution according to the present invention is now described.

As shown in FIG. 2, the method 200 comprises first disposing a server process 252 on a server within the network (step 202), or alternatively another management entity within or external to the content-based network. In the exemplary embodiment, this server comprises a BSA server 196 disposed at the hub site (see FIGS. 1-1c), although it will be recognized that the selected server may literally comprise any server or device in communication with the BSA server (such as, e.g., a content server 103, application server 104, third party proxy or web server, and so forth), or even multiple ones of the foregoing. Advantageously, the server process described herein need not be in communication with the content sources or sinks via the same communication channel(s) used to deliver the requested content element(s).

Per step 204, a corresponding client process 254 is disposed on two or more of the CPE 106 of the network (or other eligible "peer" devices, such as personal computers). Hence, the term "client process" as used herein is broadly construed to relate to devices or entities other the CPE as well.

The client and server processes or entities 254, 252 may comprise independent stand-alone applications, or alternatively parts of a distributed application (DA) of the type well known in the programming arts (see FIG. 2a). Intrinsic in this step 204 is installation of the client process on CPE that is in direct or indirect communication with the server process 252, since the two (or more) entities need to remain in at least intermittent communication with one another so that, e.g., requests for content can be sent from the client to the server, and optional data gathered by the server process 252 (e.g., CPE profiling data, historical use data, etc.) for source peers within the network. Accordingly, one or more application programming interfaces (APIs) are also provided within each process application to allow for, inter alia, communication with the other entity, communication with other remote processes, communication with the network operators (such as via a GUI), and so forth. The structure and implementation of distributed applications and APIs are well known in the programming arts, and accordingly not described further herein.

The client process can be provided to the CPE 106 using any number of different methods including, for example, download via in-band downstream channel (e.g., pulled of a file carousel), via DOCSIS modem, via downstream OOB channel, during a maintenance or upgrade service call (e.g., by a technician with the application stored on a medium such as USB key or CD-ROM), via mailed medium (e.g., CD-ROM mailed to the subscriber and installed thereby), and so forth. The client application 254 may also be installed at time of manufacture of the CPE 106, and loaded at boot-up. Moreover, the client process may be installed (and even subsequently destroyed or removed) on an as-needed basis; e.g., only when the subscriber requests the content, and there is a situation necessitating reconstitution. This latter approach advantageously keeps the client as "thin" as possible, and reduces processing overhead associated with registering and maintaining software that is only perhaps very infrequently used.

Next, per step 206, the server process 252 is initiated and receives programming inputs from the MSO or network operator as to the desired configuration. These inputs may be manually entered by the MSO/operator, or alternatively be drawn from one or more custom configuration files, each file for example providing a different set of configuration parameters that are optimized for different operating, delivery and reconstitution scenarios.

Per step 208, the server process 252 optionally generates a "rules" file for the CPE 106 which will dictate how the CPE client process 254 will operate to process received or stored content, evaluate for errors or other issues necessitating reconstitution, collect data for the server process, and so forth (as applicable). In this regard, the client process 254 of the illustrated embodiment acts as the server process' proxy, in effect being a slave to the rules set forth by the server process 252. However, it will be recognized that the present invention may also be configured such that the client process 254 has varying levels of innate intelligence as well as configurability (whether by the MSO, or by the subscriber themselves), thereby allowing it at least in some aspects to determine its own operational parameters, or even dictate rules to the server process.

Moreover, the present invention also contemplates a server-less embodiment (see, e.g., the exemplary configuration of FIG. 4*d*), wherein a true or pure P2P approach is used (i.e., one that operates entirely on a client-client basis with no server process). This may be particularly useful where source and sink peers are entirely constrained within a given distribution node (e.g., hub), and hence very little if any intelligence is required to orchestrate a file or data transfer. Similarly, a "one-to-one" sink-to-source architecture lends itself well to this (server-less) approach, since only two entities (one source and one sink) need communicate, and tracking of multiple eligible sources is not required.

Varying levels of server process involvement may also be utilized, such as where the server process only (selectively) becomes involved in the acquisition, delivery and/or reconstitution processes under certain circumstances; e.g., when the client process itself cannot efficiently or effectively locate suitable peer sources, bandwidth contention exists, and so forth.

In generating the optional rules file, the server process 252 of the exemplary embodiment allows the network operator (e.g., MSO) to build a customized policy (which may be based on subscriber inputs as well) for how the corresponding client process 254 on the CPE 106 operates. For example, the MSO can specify: (i) where to store the requested content on the CPE or connected devices (if applicable); (ii) program channel or tuner coordinates (whether in-band, DOCSIS, or otherwise) where the delivery will take place, (iii) circumstances and types of data to collect regarding CPE profile and capabilities, content errors or problems, subscriber historical data, etc.; (iv) permissible latency and delivery mode for the requested content (e.g., to support real-time streaming request, opportunistic, etc.), as applicable. Other directives or policies may be generated by the server process (alone or in conjunction with MSO operator inputs) to form the rules file sent to the client(s) 254.

Use of a server or MSO-based rules file or comparable data structure, while optional, advantageously enables the MSO to impose operational and other restrictions on the client processes, as well as maintaining the acquisition, delivery and reconstitution processes effectively transparent to the user. Specifically, the user is not required to navigate menus, select possible content sources, OK downloads, etc., but rather can merely specify their preferences, such as at time of signing up for the service, and not be bothered with it thereafter if desired.

Should the delivery of the (transparently) requested content be delayed or unavailable, the delayed content notification apparatus and methods described in co-owned U.S. patent application Ser. No. 11/706,620 filed Feb. 14, 2007 entitled "METHODS AND APPARATUS FOR CONTENT DELIVERY NOTIFICATION AND MANAGEMENT", and issued as U.S. Pat. No. 9,270,944 on Feb. 23, 2016, incorporated herein by reference in its entirety, may optionally be used to provide notification to the subscriber, as well as optionally an estimated time that the requested content will be available. In one embodiment, this notification is only invoked when there is a need for content.

Similarly, if so enabled, the client process 254 can generate notification rules or data (based on subscriber inputs or preferences, data collected from the CPE regarding capabilities, subscriber habits, etc.), and transmit these rules to the server process 252, wherein they will be saved for subsequent implementation. For example, one rule may relate to when and in what manner the subscriber's CPE may act as a peer source (e.g., only between 12:00 am and 6:00 am on any given day; only for certain types (e.g., non-adult) content, only for MPEG2 encoded content, only for sinks that have appropriate permissions and authentication/CA capability, etc.).

It is also noted that the configuration of the CPE 106 by way of the rules file or other mechanisms may be subscriber/tuner-specific using, e.g., the anonymous subscriber identification methods and apparatus described in co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety. For example, the MSO (or server process 252 itself) can configure individual CPE 106 according to device or tuner-specific information gleaned from that particular CPE.

Per step 210, the server process 252 next transmits the optional rules file/message to the CPE (via any of the aforementioned communication channels) whereby it is received, stored (e.g., such as a policy table or other data structure), and ultimately read by the client process 254. This transmission may comprise transmitting via a packetized protocol existing within the system for downstream communications, such as MPEG2, DSM-CC, or any other mechanism suitable for the task.

Per step 212, the client process 254 reads the rules file/policy table and then (whether immediately or with some latency as dictated by the rules file) implements the relevant acquisition/delivery/reconstitution rules. Alternatively, if the CPE's operating "intelligence" is innate as previously described, this local information is accessed to implement the desired acquisition policies or rules. In one exemplary embodiment, profiling data regarding the CPE 106 hardware or software configuration may be gathered up and sent upstream, such as on an event-driven basis (e.g., at startup) or periodically. The methods and apparatus of United States Patent Application Publication No. 20020032754 to Logston, et al. published Mar. 14, 2002 entitled "METHOD AND APPARATUS FOR PROFILING IN A DISTRIBUTED APPLICATION ENVIRONMENT", incorporated herein by reference in its entirety, can be used for such a purpose, although other approaches may be used as well. As described subsequently herein, such profiling information may be useful in allowing the server process(es)

to match content element requests with specific source devices within the network, available delivery modes, etc. For example, implementation of the rules may cause the CPE to notify the server process each time it is started, and include data on the availability of the downstream (in-band) tuner(s), upstream DOCSIS channel, DVR configuration, user preferences with respect to P2P operation, information regarding its location within the network, and so forth, which can be used inter alia to enable pool/candidate selection. Moreover, this profiling information can be used for determining whether any transcoding, transrating, resolution processing, or other content processing or CPE configuration changes must be made to deliver requested content.

Figure 3:
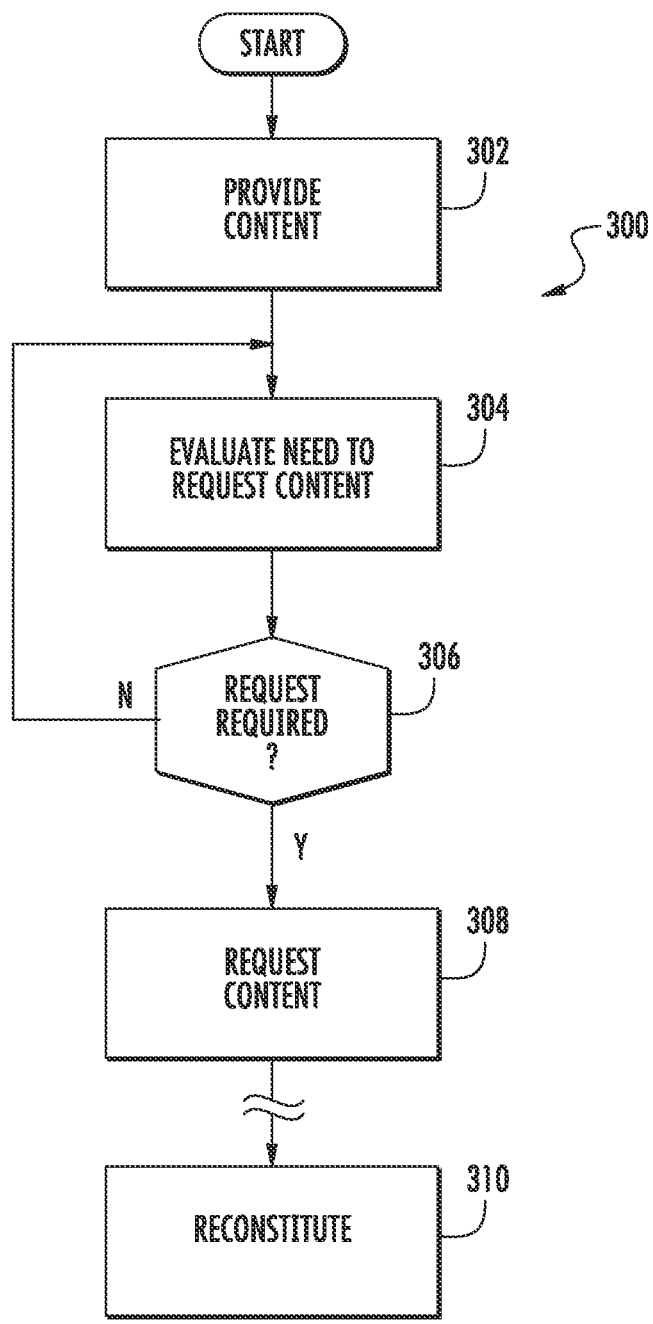
FIG. 3 is a logical flowchart illustrating one exemplary embodiment of the generalized method of operating a network so as to provide enhanced content availability and/or "robustness" according to the invention.

Referring now to FIG. 3, one exemplary embodiment of the method 300 of operating a network so as to provide enhanced content availability and/or "robustness" is described.

As shown in FIG. 3, the method first comprises providing content (e.g., data, files, gaming applications, multimedia, audio, video, etc.) per step 302. This content may be provided via a fixed medium (e.g., stored on a hard disk, RAID array, or CD-ROM or Blu-Ray disc), transmitted in a real-time or streaming fashion (e.g., from a VOD server), delivered via high-speed DOCSIS or other download, broadcast in an ephemeral fashion, or via any other method.

Next, per step 304, the need to request or obtain content (or at least portions thereof) is evaluated. Such evaluation of need may comprise any number of different techniques, including without limitation evaluating existing or received content to determine its sufficiency (whether in terms of quality, completeness, correctness, timeliness, authenticity, or otherwise), or determining that ephemeral content (e.g., a broadcast) was wholly or partially missed, and hence needs to be obtained from another source. Various mechanisms for evaluation of the sufficiency of data associated with content exist, including for example: (i) cyclic redundancy checks (CRC) and checksums; (ii) application of forward error correction techniques such as Reed-Solomon, Turbo Codes, Viterbi, low-density parity codes (LDPCs), etc.; (iii) inspection or testing of the actual physical media on which the content is stored (as applicable); (iv) evaluation of metadata, DRM data, copyright data, timestamps, sequence numbers, or other ancillary data associated with the content; (v) application of disk error check algorithms such as Microsoft "Scandisk", and so forth.

It will be appreciated that consistent with the aim of providing enhanced content availability and robustness, and improving user experience, the term "evaluation" as used in the present context is intended broadly to include without limitation: (i) detection of incomplete content; (ii) detection of content which is non-functional or corrupted for reasons other than being incomplete (e.g., file corruption, written over a bad sector or cylinder on the HDD, won't checksum properly, etc.); (iii) detection of content which has improper security, CA, DRM, or other credentials (e.g., cryptographic hash that won't hash properly, missing cryptographic data, presence or absence of a watermark or other steganographic data, etc.); (iv) detection of malware, virus, or other surreptitious content; (v) detection of an improper version or release of the content (e.g., old version of software that is incompatible with the target platform); (vi) detection of deprecated or other APIs, or non-functional code., etc.

Note that the aforementioned evaluation step 304 optimally determines specific portions or subsets of the content which require reconstitution (as opposed to the entirety of the content). This feature greatly reduces bandwidth consumption, overhead, and other resources used in acquiring and delivering the entirety of the content (e.g., portions of a movie versus the entire movie). For example, in the case of MPEG2 packets comprising a packet stream, the packet sequence numbers or other such indicia can be examined to determine if gaps exist. Similarly, CRC or other error checks may identify only a relatively small number of packets that have been corrupted.

In one implementation, a content parsing mechanism is utilized to parse the streamed or stored content. In one variant, this mechanism is offset in time; e.g., "creeps" ahead of or behind to evaluate content substantially in real time. In another embodiment, a batch evaluation or process is used, wherein an entire piece of content is evaluated before access or display thereof. Myriad other approaches will be appreciated by those of ordinary skill.

Figure 3A:
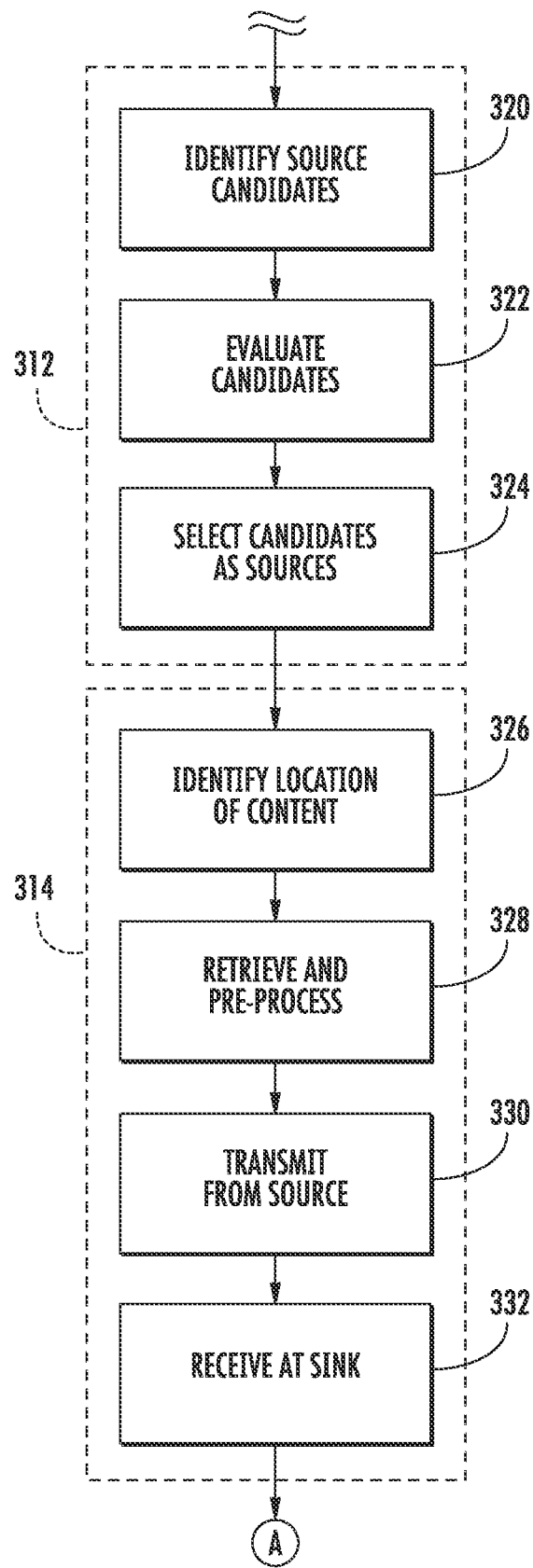
FIG. 3a is a logical flowchart illustrating one exemplary implementation of the methodology of content reconstitution used in the methodology of FIG. 3.
Figure 3A:
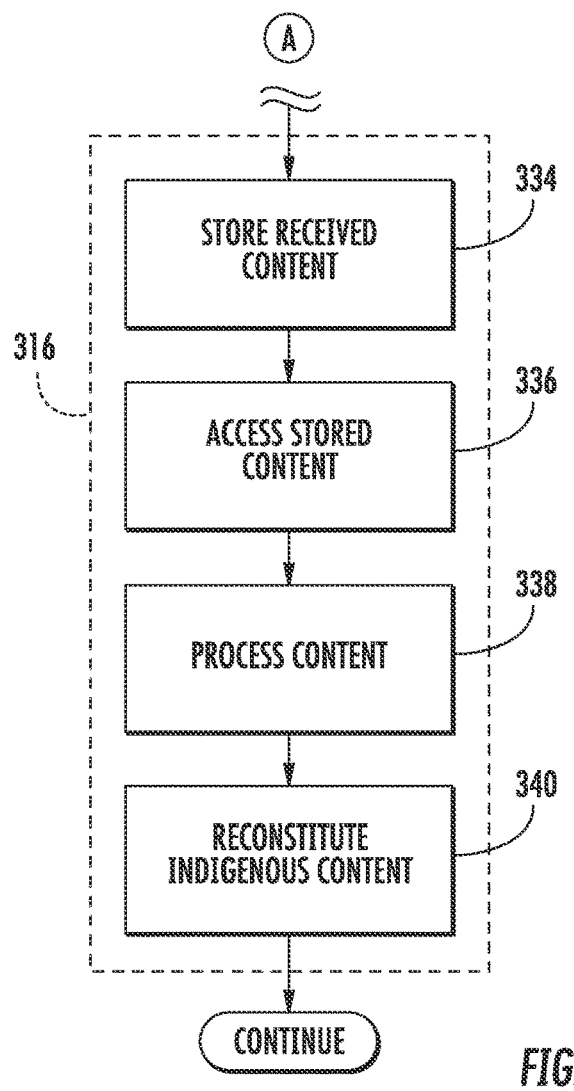

Next, if reconstitution is required (step 306), a request for the content element(s) of interest is issued (step 308), and reconstitution performed per step 310. In the exemplary embodiment of FIG. 3a, the reconstitution methodology 310 of the invention generally comprises three (3) phases: 1) an acquisition phase 312; 2) a delivery phase 314; and 3) a reconstitution phase 316.

The acquisition phase 312 in one variant comprises: (i) identifying one or more source candidates from a candidate pool (which may be as few as one candidate device) per step 320; (ii) evaluating these candidates based on one or more attributes per step 322; and (iii) selecting one or more sources from the candidates based on at least the evaluation per step 324.

Figure 3B:
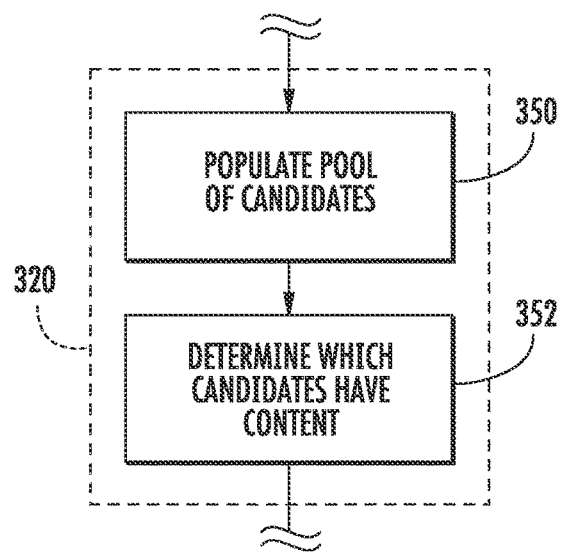

Identification of one or more source candidates from a pool comprises in one embodiment (FIG. 3b): (i) populating the pool with a population per step 350; and (ii) determining which individuals of the population have the requested content elements available per step 352. Populating the pool may be conducted according to any number of different approaches, including e.g., designating all CPE within the network, designating only CPE within a given logical or geographic portion of the network, such as based on IP address, hub or node association, zip code, etc. as being within the pool, designating only CPE associated with subscribers that have opted to act as peer sources, etc. This can be done manually (e.g., by an operator), or automatically (e.g., via an algorithm of the type described in greater detail elsewhere herein. The methods and apparatus disclosed in co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, can be used consistent with the present invention as well. For example, in one variant, CPE within the network can be identified (anonymously if desired) and segregated according to any number of parameters (e.g., zip code, etc.) or boundaries, and placed in "peer pools".

In another aspect, the anonymous CPE identification capabilities afforded by the foregoing disclosure (e.g., one-way cryptographic hash) allow the MSO or its proxy to uniquely but anonymously associate or identify CPE, such as for use in a pool of peer sources, or as a sink. For example, a given subscriber may have concerns about using the acquisition/reconstitution approach of the present invention based on privacy concerns (e.g., they do not want the MSO or another subscriber to know what content they have downloaded or purchased, or provide any sort of directory or listing of available content).

Evaluation of the candidates identified can be conducted according to any number of different approaches as well. For example, one filtering or selection criteria may be based on the status of the subscriber's CPE (powered up or not), whether the subscriber has opted to act as a peer source for content (and if so, whether the request falls within that subscriber's delivery window mask or other restrictions), the geographical or topological relationship between the requesting sink and the candidate source(s), etc.

In one embodiment, peer source devices within the network publish or provide a directory or listing of content available for sourcing on their device (e.g., DVR). This may include all or less than all of the content stored on (or otherwise accessible to) that device. For example, upon registering or being designated as a peer source, the user might be presented with a GUI or other interface that allows them to mark or otherwise denote titles that are available for distribution from their peer.

Different access privileges and masks can also be specified. For example, in one variant, the source peer can specify certain types of content that can be accessed with a first privilege or permission level, other types of content that can be accessed via a second level, and so forth. One such scheme might apply to adult content, wherein a certain sink CPE 106 is precluded by the subscriber (or the MSO) from requesting or accessing adult content on any other peer, as specified e.g., by a user-defined profile. Conversely, a source peer might have a mask which prevents that peer from providing any adult content to any requesting peer.

As another alternative, the source or sink peer might be masked based on date or time of day; e.g., allow for P2P operation only during prescribed period of the day, such as when the subscriber is home (and their DSTB or DVR presumably turned on).

As yet another alternative, the source or sink peer might be masked based on date network operational parameters or considerations, such as actual or predicted available network bandwidth. As described elsewhere herein, one of the benefits of using a "local" peer approach is that downstream bandwidth that would otherwise be consumed in servicing retransmission requests is not needed, since local peers (including in some cases upstream bandwidth for at least a portion of the haul) are being utilized instead. However, this may become more or less critical as a function of time or network condition. Accordingly one embodiment of the invention comprises the server process 252 (or another management process) that monitors network downstream bandwidth availability (whether actual or predicted) and selectively allocates or routes requests to (i) different peers within the network, and/or (ii) network servers normally used to service retransmission requests. For example, when the network is lightly loaded in the downstream direction, the management process may route the subscriber's request for content elements to a network server (e.g., VOD server, application server, etc.) that can efficiently and perhaps more rapidly service the request. This may be especially true where the requested content elements are large in size, or require other particular processing or handling (such as transcoding, etc.), or where no peers for a given content element exist.

In another embodiment, available source peer lists are populated based on CPE profile or other data obtained by the MSO or directly from the (candidate) source peers themselves by the sink peer. For example, in one variant, the candidate mask populates the list with only CPE that have a codec of the same type and version as the sink CPE, thereby ostensibly avoiding any incompatibility or transcoding issues.

The present invention further contemplates that the selected population of source peers may be dynamic; i.e., new peers may be added and existing peers removed or "dying" during the course of any given delivery. Moreover, in systems with multiple server processes 252 (e.g., trackers), these processes may coordinate with one another and even hand off management of a delivery (e.g., torrent) to each other, such as to conserve network resources. Server processes or trackers may also be assigned only certain peers within the network (e.g., on a logical, geographic, topological, subscription level, demographic, psychographic, or other basis), and hence certain servers may be more optimal than others to service certain requests, depending on the nature of the request, location geographically or topologically, and so forth.

For example, a given server process may be optimized for delivery on non-time critical data (e.g., computer files or applications), whereas another is optimized for real-time streaming delivery. Accordingly, the present invention contemplates the use of heterogeneous server processes (and P2P systems in general) which are each optimized to accomplish one or more desired functions. Moreover, source peers can be selected by these individual server processes based on their particular performance or operational attributes (and relevance to the desired optimizations). In the context of the foregoing non-time critical and real-time streaming server processes, for example, candidate peers with very thin processing capability may be undesirable for real-time streaming applications, since they would be more prone to interruptions due to other indigenous processing requirements (e.g., servicing on-screen display or EPG requests, etc.). Similarly, CPE 106 without an upstream DOCSIS tuner/channel would be limited in their streaming rate, and hence would be less desirable.

In another variant of the invention, the acquisition and/or delivery processes may be made opportunistic in nature. For example, in one embodiment, the process waits for idle or reduced activity periods (or CPU cycles), such as based on periodic or event-driven sampling of one or more sources and/or the requesting sink, before instigating the acquisition, delivery, and/or reconstitution phase. This can become fairly complex, since many variables may be involved.

For example, the source may not have a sufficient processing capacity available at the time of the request to service it.

Alternatively, it may be that a selected source CPE 106 has sufficient available capacity (CPU cycles, etc.) to perform the acquisition and at least portions of the delivery phase (e.g., encryption processing, error correction, packetizing within the prescribed protocol for transmission, etc.), yet suitable bandwidth is not available to deliver the processed elements in a timely fashion, such as where the DOCSIS upstream bandwidth is almost totally consumed with an ongoing large upload.

Similarly, suitable sources and bandwidth (upstream, and downstream to the sink) may be available, but the sink CPE may be otherwise occupied and not able to receive the requested elements. For example, the sink may have only one tuner that is presently tuned to an in-band channel dedicated to an ongoing VOD session, or its storage device (e.g., connected DVR) is nearing its limit on storage space.

Accordingly, a "weakest link in the chain" approach may be employed as part of the aforementioned methodology, wherein end-to-end evaluation of the entire process is conducted to see if all of the necessary phases can be completed according to the specified criteria (which may be, e.g., ability to support true streaming delivery, delivery and accessibility within a certain time frame, compatibility between the source-encoded content and the sink's codec, etc.). This also infers that not only may sources be selected or evaluated, but also communication channels, available bandwidth, and the sink peer as well to ensure that the reconstitution process can be completed in a manner that meets the desired performance criteria, and does not cause subscriber frustration.

The foregoing method steps can be combined and/or permuted as well. For example, an exemplary algorithm according to the present invention might first filter all prospective source peer candidates based on logical or physical location within the network, and then based on whether they have the requested content elements or not. Alternatively, the primary filter criteria might be whether the subscriber has opted to act as a peer source within the network or not, with those which have opted-in then being screened for geography or network topological location (e.g., proximity to the requesting sink), and/or whether they have the requested content available or not. Alternatively, after identifying those subscribers who have opted-in, the algorithm might then search for those whose CPE is powered up (based on e.g., ACKs received from the device when pinged, or other such status information) and fall within the delivery time window (mask), or which are not operating in portions of the network that are heavily bandwidth-constrained or loaded.

Other evaluation criteria might include for example subscription level of the prospective source, presence of high-bandwidth upstream channel or not (e.g., select only CPE with DOCSIS upstream channel), the size of the requested content element(s), the CPE hardware or software profile (e.g., similar codecs, processing speed, conditional access restrictions, encryption capabilities, etc.). Literally endless permutations of the foregoing will be appreciated by those of ordinary skill when provided this disclosure.

When the evaluation has been performed, one or more of the candidate sources is selected for delivery of the requested content elements. The selected sources may be used in a lineal fashion (i.e., first or optimal choice used to service the request, second choice, and so forth), or used in parallel, such as where multiple sources are used to provide different requested elements (e.g., a "torrent"). Moreover, a constant or periodic re-evaluation of the candidates may be conducted (even within the space of servicing a given request), and the selected sources reprioritized. For example, one of the selected sources may be turned off by the subscriber, thereby removing it as a viable source. Alternatively, changes in bandwidth usage for the portion of the network where a given selected source resides may occur, making that source more or less desirable from a bandwidth allocation/conservation perspective. Myriad other situations may exist which cause a reallocation of sources and/or their priority.

The delivery phase 314 comprises in one exemplary embodiment: (i) identifying the location (e.g., directory and drive, memory address, web server address, etc.) for the requested content elements to be delivered on the selected source(s) per step 326; (ii) retrieving and pre-processing (as required) the requested content elements per step 328; (iii) transmitting the content elements over one or more selected communication channels per step 330; and (iv) receiving the transmitted content at the sink (or a proxy) per step 332.

As discussed elsewhere herein, the source peer may be a CPE 106 or similar device, or may be a remote device outside the network, a proxy for the CPE (either within or outside of the network), and so forth. Accordingly, once the candidate sources are evaluated as described above, one or more sources are tasked with providing the requested elements. In a simple scheme, one source is used to provide one or a plurality of content elements to one sink (requester). In a more complex approach, the one or more content elements (or portions thereof) are provided by a plurality of sources effectively operating in parallel; see the discussion of the exemplary BitTorrent-based embodiments provided subsequently herein with respect to FIG. 4. This parallel operation may be performed according to a multiple access scheme (e.g., time-divided or multiplexed, direct sequenced, frequency or carrier (e.g., QAM) divided), or merely through normal or extant delivery infrastructure of the bearer network.

Pre-processing of the content elements to be transmitted per step 328 may comprise any number of different processes, including for example: (i) encoding/decoding/transcoding; (ii) encryption and/or signing (or decryption and re-encryption using another trusted domain key or digital signature); (iv) data permutation or scrambling; (iv) filtering, transformation, noise reduction, error correction, or other signal processing; and/or (v) insertion of watermarking or other steganographic or DRM data. This may be performed by the source peer, or a designated proxy.

Moreover, while not actually performed on the content per se, other processing may be performed before or during transmission of the content. For example, processing of conditional access data, encryption keys (e.g., using a secure microprocessor or SM), or authentication data in order to determine the entitlement of the requesting peer to the content may be accomplished during this phase.

Transmission of the requested content from the source (step 330) will most typically occur via an upstream channel (e.g., OOB channel or DOCSIS upstream), and may even occur via multiple channels from one peer if available. Since the source peers are typically selected to operate in close geographic or topological proximity to the requesting sink, there is advantageously a relatively short "haul" from peer(s) to sink; e.g., upstream to the first common node (e.g., local distribution hub), and then back downstream via e.g., an in-band or DOCSIS channel to the requesting peer, such as via a replication mechanism or router. Hence, the entire propagation path for the requested content may be kept at or near the network edge, as opposed to having to involve the core of the network (and accordingly consuming bandwidth and resources therein).

For example, the more popular a piece of content is (e.g., a first run movie disposed on many CPE), the less upstream bandwidth utilization is required for a single peer to receive the content, since one or more unicast delivery modes within the network are obviated in favor of more multicast (e.g., P2P) modes. Moreover, a greater number of CPE with the content can contribute to providing it to the sink peer (e.g., more participants in a "torrent").

Hence, a bandwidth management synergism is provided in this regard; i.e., instead of requesting a retransmission from an ostensibly already heavily loaded or overloaded downstream infrastructure, the CPE 106 with corrupted or missed content can obtain only the components or elements of the content it needs to reconstitute from peers, thereby not further loading the downstream infrastructure (or at least significant portions thereof). Moreover, since loss or corruption of data may be most likely to occur when the network is operating at capacity or transitions into an "overloaded" state (i.e., conditions where no "graceful degradation" occurs), the request for a retransmission issued from CPE to the network core may create a further excursion or degradation of capacity. Specifically, as more CPE are delivered corrupted or incomplete content (i.e., as the network degrades "non-gracefully"), more requests for retransmission would arise, thereby further exceeding capacity, potentially in a cascade-like manner. However, by requesting the necessary content elements from peers, and in some cases selectively delaying delivery until adequate bandwidth or capacity is available, this situation can be largely avoided. Only local portions of the network (e.g., other subscribers on the requesting CPE's same hub) would typically be required for the aforementioned peer delivery mode.

Furthermore, if the bandwidth management entity (SRM, server, BSA hub device, or other process or device in the network) is aware that at least certain CPE are operating in a "peer" mode, it can allocate bandwidth in the network differently than it would if it had to service numerous potential retransmission requests.

Moreover, the delayed content notification and delivery mechanisms previously described may be used in a cooperative fashion with the P2P acquisition capabilities described herein. Specifically, both the delayed notification and delivery mechanisms and the P2P mechanisms help alleviate bandwidth consumption, albeit by quite different approaches (one by delaying or structuring delivery so that sufficient bandwidth exists, and the other by servicing requests that would normally be serviced by the core at the edge, and partly using typically under-utilized upstream bandwidth). These two approaches, and in fact others, can be used selectively and in concert to shape bandwidth consumption profiles within portions of the network topology. Specifically, in one embodiment, a parent supervisory algorithm or process (e.g., server process 252) may be used within the network to selectively push content retransmission or other such requests out to the edge of the network (e.g., to peers as described herein) at times when core bandwidth consumption is high, in effect avoiding delaying delivery to the maximum extent practicable (since this may lead to increased user dissatisfaction, at least for requested streaming or real-time delivery). Similarly, where delay is required at the core, a trickle or opportunistic mode can be invoked to service download requests, and even peer content element requests if desired.

The exemplary methods for capacity and bandwidth consumption prediction disclosed in co-owned U.S. patent application Ser. No. 11/243,720 filed Oct. 4, 2005 entitled "SELF-MONITORING AND OPTIMIZING NETWORK APPARATUS AND METHODS", issued as U.S. Pat. No. 8,582,584 on Nov. 12, 2013, which is incorporated herein by reference in its entirety, may also be used in this fashion. In one salient aspect, this disclosure provides a substantially automated and anticipatory mechanism whereby a content-based network, such as a broadcast switched architecture (BSA) network, can effectively "self-monitor" and optimize its bandwidth allocation based on, inter alia, data received from the cable receivers (e.g., DSTBs) within its service area, or from the network as a whole. This approach replaces and substantially improves upon the manual review of activity data, and insertion of operational adjustments, prevalent under prior art network management techniques. Specifically, information gathered from the CPE (as well as optionally other information relating to, e.g., the network itself or other historical periods) is used to provide anticipatory instantiation (or removal) of switched broadcast streams within a given network. A substantially automatic software-based mechanism to retrieve data from the CPE is utilized. Analysis of the historical tuning data obtained from segments of the subscriber pool provides this software process with insight as to the expected statistical variations of the system as a function of time and various events (e.g., holidays), and the expected statistical viewing behavior of known future details of the offered content, in effect allowing it to predict subscriber behavior and make adjustments to the operational parameters of the network based on these predictions. One such adjustment may be, for example, pushing content requests out to the edge as previously described when core resources are predicted to be heavily loaded. This may also provide synergisms from the standpoint that the heaviest core loading (e.g., for VOD, BSA, and otherwise) would often occur at times when most candidate peer devices would be up and operating (typically 8:00 pm to midnight), and hence the peer source candidate pool would be largest.

Source peer "density" may also be controlled, such as where at times of heaviest loading, a larger number of source peers are used to satisfy a given request since they are more likely to make efficient use of fringe or wasted bandwidth (as compared to use of one source peer consuming the aggregate in bandwidth of the plurality of other peers, which may significant in size).

Note also that in the exemplary embodiment of the present invention, the content backhauled from the source peers need not be routed to the server process 252 or other managerial entity (e.g., "tracker" discussed below with respect to the exemplary embodiment of FIG. 4). Rather, such process or tracker can act merely as a supervisory or control entity (via in-band or OOB signaling or messaging, etc.), without ever receiving, processing, or handling the content itself.

If desired, however, the tracker or server process can also act as a content processing agent or node as well, such as e.g., where the server process is co-located with the source or sink peer(s). In one such embodiment, the server process 252 (and optionally the client process 254, such as where the CPE 106 is configured to function as both source and sink) comprises a portion of the device middleware. If the server process needs to communicate with other source CPE for coordination, this can be accomplished via upstream-then-downstream messaging (whether via OOB, TCP/IP over DOCSIS, etc.), or even a dedicated channel assigned for this purpose.

Transmissions of requested content can also be multicast or broadcast if desired. This may be desirable where multiple requesting peers have issued simultaneously (or at least in some fairly close temporal relationship) requests for similar content elements, or where the managerial process (e.g., server process 252) recognizes that several similar or identical requests are queued or pending servicing. Certain economies of scale can therefore be realized by having the upstream transmission from a transmitting source peer distributed more broadly after it reaches the first (e.g., local) distribution node. This can be accomplished by, in one embodiment, multicasting or broadcasting the transmitted content elements to all peers within that local node. For example, the management or server process 252 may instruct the local node to replicate the message(s) and transmit or forward them to all or a subset of the IP or CPE addresses (e.g., TUNER IDs, MACs, etc.) within that node. In another embodiment, the management process buffers or caches the transmitted content elements (e.g., at the hub or node) for a period of time while evaluating whether any other requests for that content have occurred.

The foregoing process can be speculative as well. In one such variant, historical, predictive, or other information may be used to speculate as to the need for providing content elements within a distribution node or hub. For example, if a first-run movie or broadcast of great interest is made available, and there is a very high demand for it, and the network is operating at or near capacity to service these requests, it is feasible that the likelihood of someone missing recording the content (or the content being corrupted in some fashion) is comparatively high. Hence, if upstream bandwidth is not critical, the management process can speculate and "preload" the hub or node cache with the content (or portions thereof), expecting that at least one of the many viewers will require at least a partial retransmission or reconstitution.

Moreover, if downstream bandwidth is not critical, the management process can just "shotgun" the content elements within the node or hub, which can then simply be discarded when received if not required by the client process 254.

Receipt of the transmitted content (per step 332) may comprise for example receiving the content over an in-band tuner, DOCSIS tuner, OOB channel, or other pathway (even wireless or other extra-network link) as desired.

The reconstitution phase 316 comprises in one exemplary embodiment: (i) storing (at least temporarily) the received content elements per step 334; (ii) accessing the stored content per step 336; (iii) performing any necessary processing of the elements per step 338; and (iv) reconstituting the indigenous content with the received elements per step 340.

Per step 334, the received content will typically be buffered (such as within a FIFO, RAM or similar structure) of the type well known in the art, thereby allowing for processing (e.g., demultiplexing, demodulation, decoding, etc.). For example, in one variant of the invention, the requested content is multiplexed onto one or more existing transport streams (e.g., QAMs) as MPEG2 packets, and hence this content is demodulated and demultiplexed as applicable, and ultimately decoded by the receiver.

Re-assembly or reordering of the packets may be performed as well in this phase. This may constitute, as in the exemplary case of a "torrent", reassembling individual packets or groups of packets. The client process 254 of the exemplary embodiment is adapted to identify the received content elements, and reconstitute the content for the subscriber. For example, in one variant, missing MPEG2 packets that have been requested are spliced by the client process into the stream of packets previously received or stored. In another variant, the extant (partial or non-functional) content is replaced in its entirety with the new data (e.g., an entire file written over).

Indigenous reconstitution or repair ("self healing") can be attempted where appropriate as well; e.g., such as before a request for peer sourcing is generated or transmitted per step 308. For example, in a RAID array (now common in many personal computers, servers and other data storage devices), the algorithm implementing the disclosed methodology may access the redundant portion of the array in order to attempt to recover the damaged or lost content before issuing a content element request (so as to avoid unnecessary cycling of peers and the network management agent (e.g., server process 252), and consumption of bandwidth. Similarly, a repair or recovery software application (such as for example Norton Disk Doctor, Scandisk, etc.) may be automatically invoked to attempt to fix the detected problem(s).

In still another variant, the reconstitution may comprises installing a received executable or software component (e.g., driver, repair program, codec, etc.), and then using this application or component to perform a function such as virus scanning, code scanning and repair, decoding or transcoding of content, etc.

Alternatively, the methods and apparatus disclosed in co-owned U.S. patent application Ser. No. 11/607,173 filed Dec. 2, 2006, and entitled "METHODS AND APPARATUS FOR ANALYZING SOFTWARE INTERFACE USAGE", and issued as U.S. Pat. No. 8,370,818 on Feb. 5, 2013, incorporated by reference herein in its entirety, can be used to evaluate and repair code. Specifically, in one salient aspect, the disclosed apparatus and methods can be used for analyzing the usage of software interfaces (e.g., application programming interfaces, or APIs) associated with a software application or library, such as for determining OCAP or other compliance. One embodiment of the invention includes an API reporting computer program which analyzes one or more inputs (e.g., file paths or classpaths). Each file path contains one or more files that are generated using e.g., the Sun Microsystems Java programming language. A software algorithm adapted for programmatically disassembling and analyzing Java byte code is used in order to, inter alia, assess what APIs are called as part of that code. Advantageously, the exemplary embodiments of the invention have absolutely no reliance on source code, and generate their report(s) strictly from compiled bytecode. Self-healing capability is also described. Hence, in one aspect downloaded or resident software applications or middleware can be evaluated using this algorithm to determine if they are compliant with a relevant standard (e.g., OCAP), and then repaired or substituted as necessary using pieces of code from other peers.

As previously noted, should the delivery or access to the requested content be delayed or unavailable (such as due to waiting to complete a download and reconstitution of content stored on the subscriber's device), the delayed content notification apparatus and methods of co-owned U.S. patent application Ser. No. 11/706,620 filed Feb. 14, 2007 entitled "METHODS AND APPARATUS FOR CONTENT DELIVERY NOTIFICATION AND MANAGEMENT," issued as U.S. Pat. No. 9,270,944 on Feb. 23, 2016, previously incorporated herein may be used to manage subscriber expectations. However, depending on the type of transfer, the peer can also be configured to provide a "rolling start" for delivery, during which the delivery can be handed off to a headend or hub entity (e.g., BSA server, VOD server, etc.) when sufficient downstream bandwidth becomes available, such as via communication between the peer's client process 254 and the server process 252 of FIG. 2*a*.

Figure 4A:
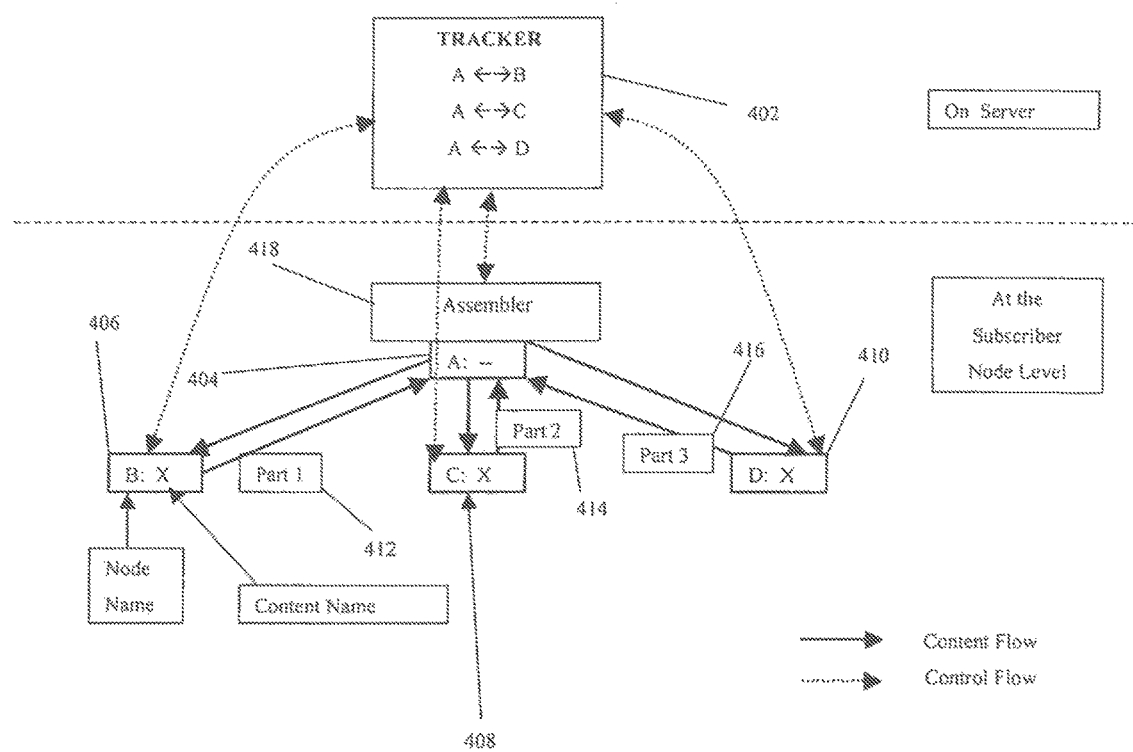
FIG. 4a is a graphical illustration of the operation of a first exemplary software architecture according to the invention, wherein a server-based tracker process is used to coordinate delivery of content from multiple peers.

FIG. 4*a* illustrates the operation of one embodiment of a P2P transfer according to the invention. It will be appreciated that while cast primarily in terms of an exemplary BitTorrent P2P architecture of the type previously described, this is merely for purposes of illustration, and the invention is in no way so limited.

As shown in FIG. 4*a*, a tracker process 402 resides on a designated server inside the network. This server may comprise literally any inter-, intra- or extra-network server including without limitation a VOD server, application server, web server, BSA server, and so forth. The tracker 402 in this embodiment manages network node (e.g., CPE 106) connections and contains routing tables for content listings residing on each node.

The requesting or sink device 404 (e.g., CPE 106) has client process (e.g., micro-torrent or µTorrent) installed that communicates with the tracker, as well as a name or other identification (ID) associated therewith (e.g., MAC address, ID, TUNER ID, opaque variable, etc.), and content stored locally. A request for one or more content elements is unicast, multicast, or broadcast from the sink 404 or a designated proxy (which may constitute the tracker 402 itself). One or more other (source) devices carrying requested content 406, 408, 410 respond to the request by sending the requested content elements. In one variant, a plurality of responding sources are utilized to send comparatively small, substantially uniform size (e.g., <512 kb) yet different pieces 412, 414, 416 of the requested content to the sink 404, wherein it is then assembled locally such as via an assembler routine 418 and disposed on the sink's storage medium.

In one variant, a DOCSIS upstream channel is used to provide upstream bandwidth for rapid delivery of the requested content elements, as opposed to a much lower bandwidth OOB or similar channel (although these other channels may be used if desired, especially in the case where DOCSIS channels are not available or are otherwise impaired). Hence, a high-bandwidth channel from the source peer to the hub is available, and similarly a high-bandwidth channel is available from the hub to the sink peer (i.e., downstream in-band or DOCSIS channel).

Figure 4B:
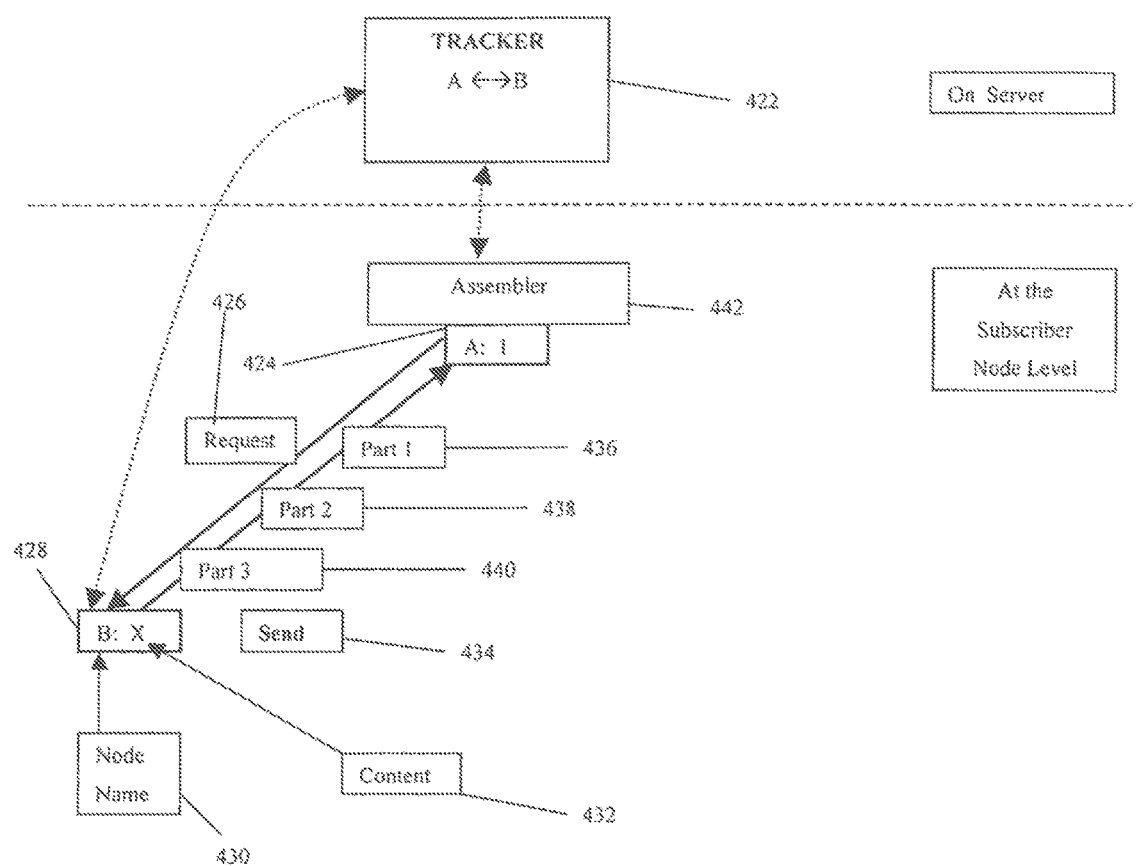
FIG. 4b is a graphical illustration of the operation of another exemplary software architecture according to the invention, wherein a server-based tracker process is used to coordinate delivery of content from a single peer.

FIG. 4b illustrates another implementation of the peer-to-peer protocol within a content based network. Here, the tracker 422 resides on a server inside the network. The tracker manages network node connections and contains content routing tables. The requesting node 424 has an anonymous node name, and content stored locally. A request 426 is sent to a known node 428 containing the content requested. The known node 428 also has a unique node name 430 and content 432 stored locally on a storage medium. The known node 428 sends 434 the content requested in small pieces (436, 438, 440), which are assembled locally using an assembler 442 on the requesting node for subsequent storage in the designated storage medium.

Figure 4C:
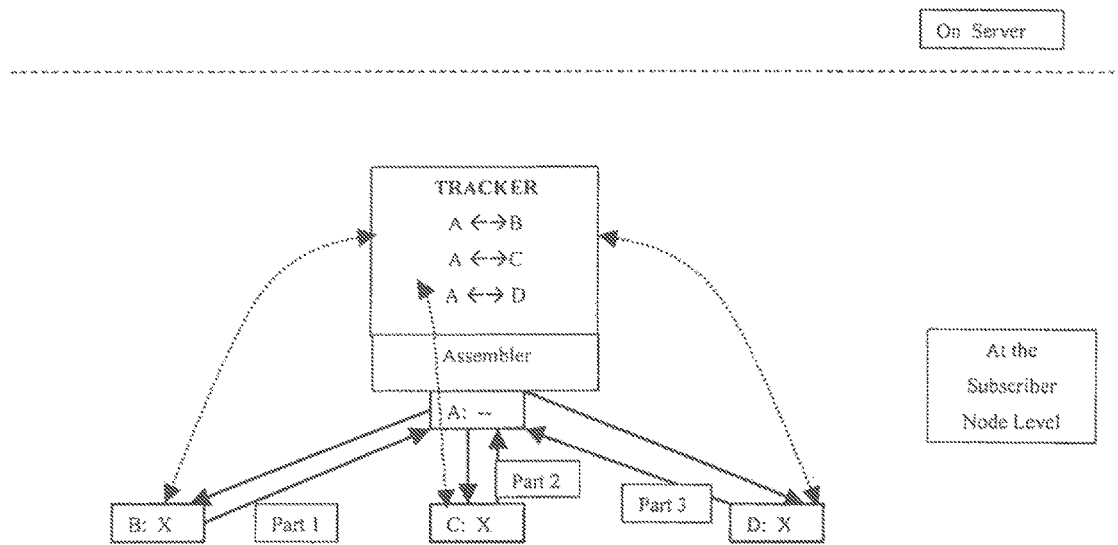
FIG. 4c is a graphical illustration of the operation of a third exemplary software architecture according to the invention, wherein a CPE-based tracker process is used to coordinate delivery of content from multiple peers.

FIG. 4c illustrates yet another implementation, wherein the tracker is resident on a peer within the network (e.g., master peer). This approach obviates a tracker disposed at or near the network core, thereby further optimizing core resource usage (i.e., all signaling and control between the "slave" peers and the master peer are also pushed out to the edge of the network.

Figure 4D:
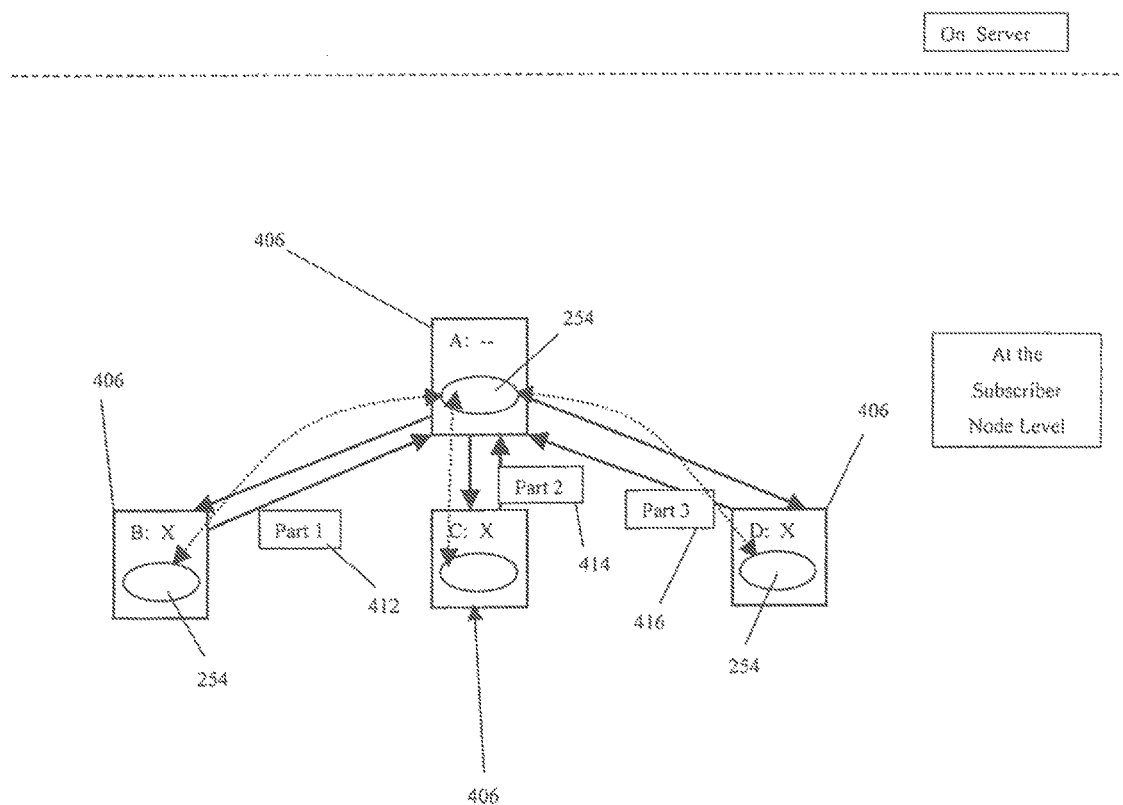
FIG. 4d is a graphical illustration of the operation of a fourth exemplary software architecture according to the invention, wherein pure (i.e., server-less) P2P process is used to coordinate delivery of content between multiple peers.

FIG. 4d illustrates still another implementation of the P2P system of the invention, wherein a "trackerless" system (decentralized tracking) is employed. In this embodiment, every peer effectively acts as a tracker. This functionality is implemented by the peer clients 254 through use of an exemplary distributed hash table (DHT) structure. As is well known, distributed hash tables (DHTs) comprise decentralized distributed systems that partition ownership of a set of cryptographic elements (e.g., keys) among participating nodes within a P2P system. Messages between the peers can be routed to the unique owner of any given key. Each node is in effect analogous to an array slot in a cryptographic hash table. DHTs may advantageously scale to comparatively large numbers of nodes, and are well adapted to continual node arrivals and departures (failures). This can be accomplished by, inter alia, forming a structured overlay network in which each participating node communicates with only a relatively small fraction of the other nodes within the array.

Figure 4E:
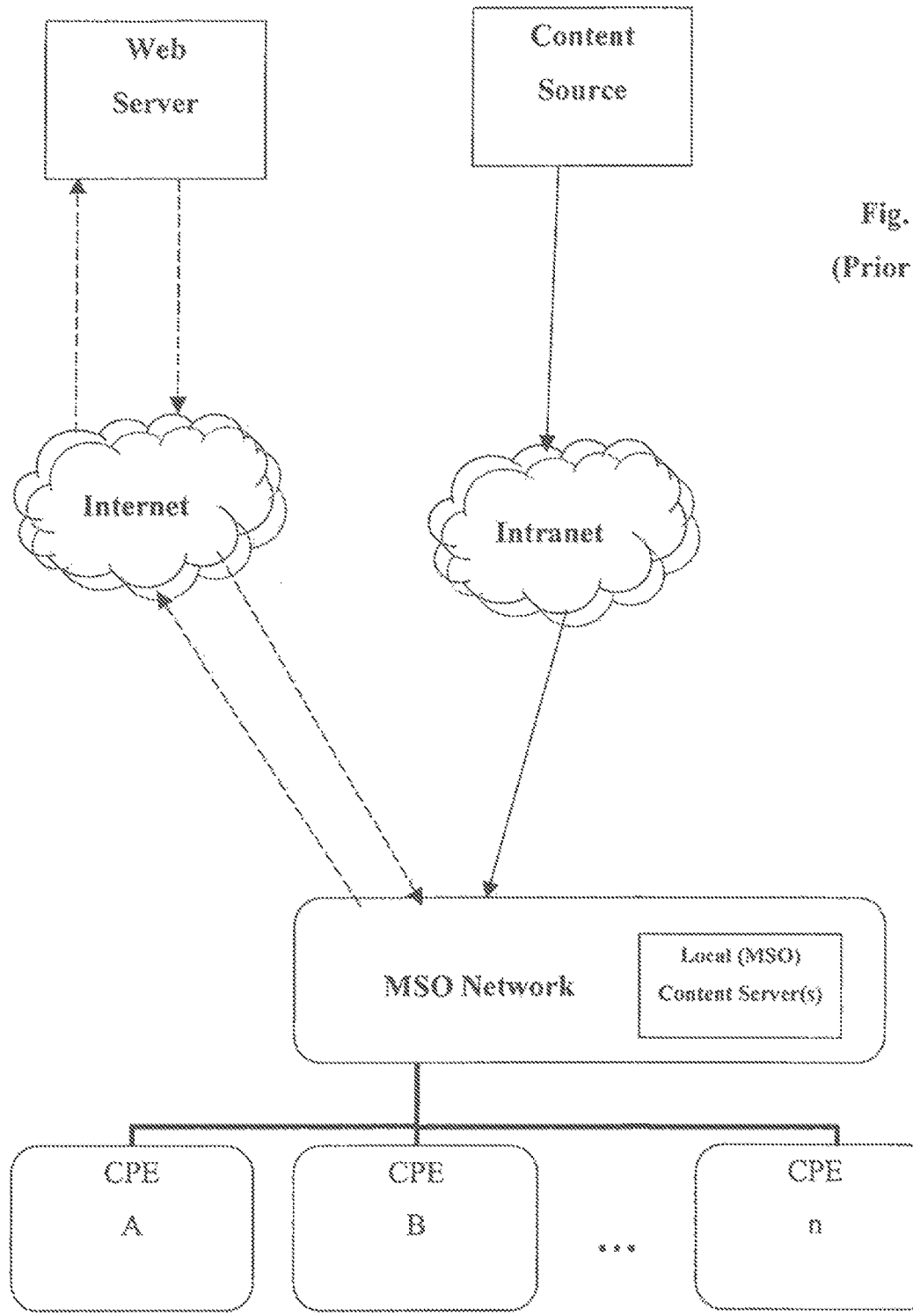
FIG. 4e is a functional block diagram of a typical prior art cable television network architecture, illustrating various content sources and paths via the core of the network.

The foregoing embodiments of FIGS. 4a-4d are to be contrasted with the typical MSO network configuration as shown in FIG. 4e, wherein a separate web server, third-party source, and internal (MSO) content servers are used to service content requests. From this diagram, it is readily apparent how more core and peripheral external network assets and resources are consumed by client device content requests, as opposed to servicing these requests entirely within the subscriber (or subscriber and MSO) level of the architecture.

In still another embodiment of the invention, a P2P architecture that is particularly optimized for streaming of real-time media is utilized. For example the methods and apparatus set forth in U.S. Pat. No. 7,174,385 to Li issued Feb. 6, 2007 and entitled "System and method for receiver-driven streaming in a peer-to-peer network", incorporated herein by reference in its entirety, allow for more optimized peer control for real-time streaming application. Specifically, in one embodiment, a "PeerStreamer" as disclosed in Li provides receiver-driven peer-to-peer (P2P) media streaming, wherein peers in the network are coordinated by clients (i.e., peer sinks), which receive streamed media from multiple peers (sources), perform load balancing, handle online/offline states of peers, and perform decoding and rendering the streaming media.

It will be appreciated that while the concept of a "peer" as discussed herein generally will correlate to a CPE, home services gateway (HSG), DSTB, or the like, literally any device in communication with the network (whether directly or indirectly) can act as a peer. A simple example might comprise two DSTBs within the same MSO hub acting as peers to one another. Or, a DSTB and a personal computer within the same hub might act as peers (e.g., via the PC's DOCSIS channel and the CMTS).

Alternatively, a "slung" (e.g., slingbox-enabled) laptop computer and a DSTB not within the same hub could act as peers. For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a TD-enabled Windows XP-based or similar PC via an IP network such as the Internet, and hence the user can view the data locally (i.e., at the same premises) or remotely so long as they have access to the IP distribution network. Hence, the DSTB with DVR capability could interface to the remote PC or laptop via the sling/IP interface.

Alternatively, two DSTBs within different hubs could act as peers, this configuration still typically providing some benefit regarding reduced consumption of network core capacity. As yet another alternative, a DSTB and an Internet web server might act as peers. Myriad permutations and combinations of different devices and network topologies will be appreciated by those of ordinary skill consistent with the present invention.

Remote content storage can be used with various embodiments of the invention as well. For example, one simple architecture according to the invention contemplates (source) peer devices having a local storage device (e.g., HDD), from which stored content is drawn. However, in another embodiment, the peer's designated storage location is remote to the peer; e.g., network-based storage. One variant of such network-based storage is where the content is stored for the subscriber at the cable headend 150 or a designated hub server (e.g., at a BSA switching hub). Another variant places the storage at a web server or other network device outside the MSO delivery network. Still another variant places the storage within the subscriber's PAN, premises LAN, or other local location.

In another embodiment, one or more source peers can act as another VOD or broadcast server (PVOD or proxy-VOD) if downstream bandwidth is constrained. For example, in a simple case, a given peer with DVR capability that has an entire piece of content (e.g., movie) stored thereon can, during its designated P2P source window, act as a streaming server to other peer devices. The client associated with the source peer may also optionally provide VOD-like functionality (e.g., trick modes) to the requesting peer via, e.g., Lightweight Stream Control Protocol (LSCP) or similar protocols. See, e.g., co-owned U.S. patent application Ser. No. 11/013,665, filed Dec. 15, 2004, entitled "METHOD AND APPARATUS FOR HIGH BANDWIDTH DATA TRANSMISSION IN CONTENT-BASED NETWORKS", and issued as U.S. Pat. No. 8,522,293 on Aug. 27, 2013, incorporated herein by reference in its entirety. In effect, one peer may be watching a movie from another peer's DVR. The receiving peer can also record the streamed content on its own indigenous DVR. This approach advantageously pushes large amounts of bandwidth to the edge of the network, as opposed to accessing a VOD server at the network core.

As previously described, various embodiments of the invention may employ a substantially or completely automated process wherein the various features, configurations, and other potentially heterogeneous factors associated with the CPE or peers of the network are considered to provide a transparent solution for network users. Specifically, prior art P2P systems such as BitTorrent typically require an appreciable amount of user interaction in order to select files or activate various features to e.g., interact with other peers. For example, a user must select the name of the file desired, and perhaps the format of the encoding (e.g., Windows Media, Real, etc.) from a list of possible files and formats. The BitTorrent system then uses this information to select peers for delivery of the requested content.

Moreover, BitTorrent and the like are generally applicable within a homogeneous transport medium or network (e.g., TCP/IP over the Internet). While PC or other device configurations may vary, they all generally must support the TCP/IP transport and network protocols. This is not necessarily the case in the potentially heterogeneous environment of a content-based (e.g., cable, wireless, MAN/WAN/LAN, internet/intranet, etc.) network, wherein multiple transports may be supported. For example, one delivery paradigm within a cable network comprises so-called "in-band" delivery of MPEG2 encoded packets over the downstream QAMs. Alternatively, the same network may deliver OOB or DOCSIS traffic (e.g., TCP/IP over QAMS, which may or may not MPEG encoded. For instance, one deliver mode for so-called "IP TV" might comprise MPEG-over-IP-over-MPEG, as previously discussed. Hence, a given peer device (e.g., DSTB or DVR) might operate within one such domain, while another prospective peer (which may even be a wireless device such as a mobile phone or the like; see e.g., co-owned and co-pending U.S. patent application Ser. No. 11/258,229 entitled "METHOD AND APPARATUS FOR ON-DEMAND CONTENT TRANSMISSION AND CONTROL OVER NETWORKS" filed Oct. 24, 2005 incorporated herein by reference in its entirety) operates in another. This presents significant barriers to the application of a standard BitTorrent "TCP-IP" type model.

In contrast, the exemplary embodiment of the present invention allows for a process that is completely transparent or invisible to the subscriber, thereby avoiding literally all interaction with the system (if desired; obviously varying levels of access, configurability, and interaction may be employed). This advantageously frees the subscriber from having to access menus, look through lists, determine what codecs or formats are compatible, and so forth. Rather, the P2P algorithm of the exemplary embodiment considers the configuration of both the source and (prospective) sink peers to determine incongruities or differences that may cause either (i) non-selection of a given peer as a source for a given requesting sink peer; (ii) manipulation of the content before or after delivery so as to make the two device environments congruent; or (iii) manipulation of the source or sink peer configuration so as to resolve any incongruities.

For example, in one embodiment, transcoding or transrating of content may be conducted in order to resolve an incongruity between the codec format used by the source peer and that used by the sink peer. For instance, the source peer may be operating in a TCP/IP environment, whereas the sink peer is purely MPEG2 (e.g., downstream QAM/tuner) capable. Similarly, one codec or environment may operate at a given bitrate, which is not compatible (e.g., too low, or no QoS or real-time streaming capability) with a required bitrate, resolution, or format (e.g., HD, SD, or sub-resolutions thereof, such as for example where the SD level includes levels SD1, SD2, . . . SDn, and the HD level similarly includes HD1, HD2, . . . HDn, with each of these sub-levels having different data rates and/or other characteristics; see, e.g., co-owned U.S. patent application Ser. No. 10/881,979 filed Jun. 29, 2004 entitled "METHOD AND APPARATUS FOR NETWORK BANDWIDTH ALLOCATION", issued as U.S. Pat. No. 8,843,978 on Sep. 23, 2014, incorporated herein by reference in its entirety) of the sink peer, thereby requiring bitrate normalization or processing ("transrating").

It will be appreciated that the transcoding and/or transrating functions previously described may be performed at any point within the content delivery chain, including without limitation: (i) by the generator of the content (e.g., a studio that provides multiple different coded forms of the same content for use by different platforms); (ii) by a third-party provider (e.g., Google™ or YouTube™), before or at time of delivery over the indigenous MSO network; (iii) by the MSO at ingestion/acquisition (e.g., via a headend); (iv) after ingestion, but before delivery within the MSO network (e.g., at a local node or BSA switching hub, or storage device of the MSO within its distribution network); (or (v) by peers (e.g., before or after transmission to a requesting sink or proxy).

Heterogeneous environments can also be supported in terms of user interfaces if desired; e.g., where a "TCP/IP" YouTube video or the like is presented within the user program guide or playlist of a CPE peer. User selection of this incompatible format would, in one embodiment, initiate transcoding/transrating as necessary, such as via a network server, or another peer, (or even by the requesting peer itself).

Hence, using the foregoing techniques, the requesting peer can be seamlessly provided the desired content in the appropriate format for its particular environment, without user intervention if desired. This algorithm may be implemented at the network level (e.g., using a tracker or similar process of the type described elsewhere herein), or even at the peer level, such as where a requesting peer is tasked with identifying eligible peers and causing the necessary transcoding, transrating, etc. to occur.

In one embodiment of the invention, a network protocol (e.g., the Session Setup Protocol, or SSP of the type well known in the art) is configured to provide the necessary information or exchange of information between peers and/or server/tracker processes in order to effectuate any required transcoding, transrating, or other processing. In one embodiment, a session request message utilized by the SSP is used to provide information from a requesting sink peer (or server process) as to that peer's capabilities, configuration, etc. For example in one variant, one or more fields with the message body or header are populated with data indicating things such as: (i) type of codec used; (ii) nominal or maximum bitrate(s) supported; (iii) display resolution capabilities, (iv) conditional access, security or encryption capabilities or requirements; (v) digital signature or authentication information; (vi) type/manufacturer of device; and so forth. The receiving entity can then use this information to assess compatibility or incongruities, and the need for any transcoding, transrating, or other processing.

Other protocols can clearly be used as well, such as for example the well known Session Initiation Protocol (SIP), now ubiquitous in many networked systems. For example a SIP Invite message may be configured as previously described in order to effectuate the aforementioned information transfer.

Moreover, it will be appreciated that protocols (or payloads) may be dynamically adapted or switched for these purposes, such as where certain configurations of CPE or peer require certain types of information or capabilities, and other types of CPE other information or capabilities. For example, SSP might be applicable to communication with one entity, while SIP might be applicable to communication with another.

It will be appreciated that the foregoing mechanisms can also be applied in any temporal relationship or delivery mode. For example, as previously noted, the download of content to a sink peer can be accomplished using trickle or opportunistic modes; accordingly, transcoding, transrating, etc. can be non-real time (i.e., does not need to adhere to streaming requirements).

Alternatively, the transfer of content can be bursty (e.g., one or more high-speed downloads), in which case the transcoding or transrating would be accomplished typically before or after the download was complete.

As yet another alternative previously described, one or more peers can stream so as to support a real-time streaming delivery (e.g., via a session or other mechanism similar to VOD), wherein the temporal relationship of the delivered packets is important, at least within the constraints of any jitter buffer or other scheme for assembling and presenting the streamed content. In this case, the transcoding, etc. if any would need to at least support the required real-time streaming bit rate at the sink peer, in effect a kind of "just-in-time" processing.

It will also be recognized that a given peer (or collection of peers) within the network can act as transcoding, transrating, etc. proxies. That is, the peer(s) performing the transcoding need not necessarily be the one(s) delivering the transcoded, transrated, etc. content to the requesting peer. For example, a delivering source peer might task or "subcontract" processing services out to another peer, such as where additional processing capability is needed. Such proxy services may be controlled by the server process 252, or even locally by a source peer, such as where the source peer maintains a registry or listing of other peers that can act as processing proxies.

Figure 5:
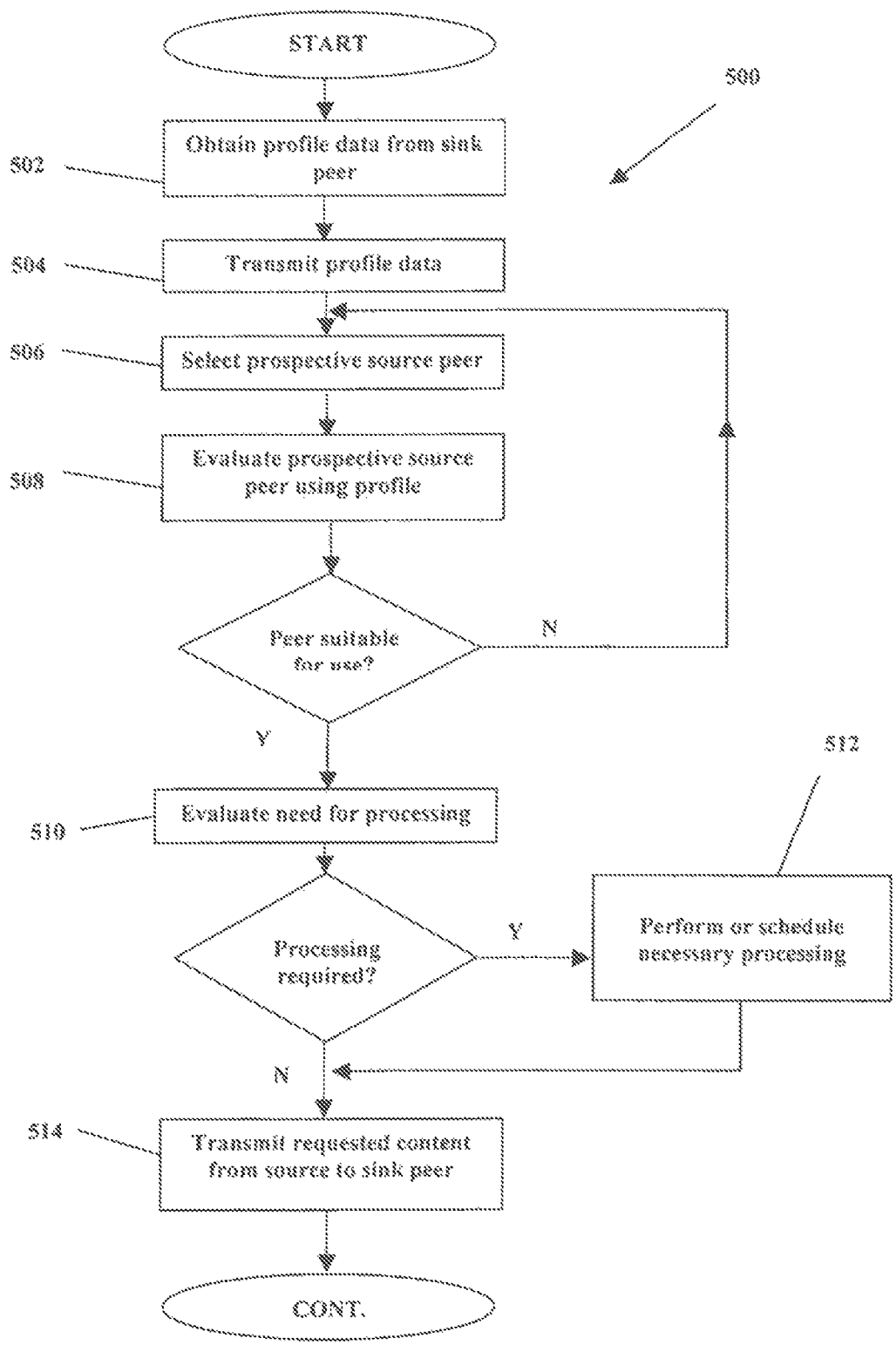
FIG. 5 is a logical flow diagram illustrating one exemplary embodiment of the method of providing content to a network peer device using substantially automated processing.

FIG. 5 illustrates one exemplary embodiment of the method of transferring content to a network peer device (e.g., CPE) using substantially automated processing according to the present invention. As shown in FIG. 5, the method 500 comprises first obtaining profile data from a requesting peer or CPE (step 502). This may be accomplished via e.g., the aforementioned client process 254, such as by polling a hardware or software registry, determining installed components (e.g., middleware version, operating system type and version, installed codecs, etc.), determining available storage on a mass storage device, and so forth.

It will be appreciated that some peers (CPE) that may be very "thin" in terms of capabilities may not even have a mass storage device such as a HDD, and hence must use RAM to support the real-time media stream, versus using part of the mass storage device as virtual memory or the like. Hence, in such cases, the profiling process or manager must also determine what modes of delivery are supported so that e.g., a burst download is not used which exceeds RAM or network interface capacity, etc.

Next, per step 504, the relevant profile information is transmitted to another network entity, such as another peer (in a "pure" P2P scenario), or a server process 252 or tracker as previously described. This may be accomplished via OOB, in-band, DOCSIS or any combination of communication channels available. For example, in one variant, the aforementioned SSP or SIP is configured to include parameters relating to the requesting peer's configuration and/or capabilities, and a session request/invite or other such message is sent to the source peer or server process accordingly.

Next, per step 506, one or more prospective source peers is selected.

Next, per step 508, an optional evaluation or determination is made regarding source peer eligibility based on inter alia the profile information is made. For example, if incompatibilities between source and sink peer are detected, and these cannot be overcome via adaptive or corrective processing (e.g., transcoding, transrating, resolution processing, etc.), or the available delivery paradigm is not consistent, then that peer will be eliminated from further consideration as a source for the requested deliver.

Per step 510, once a peer is selected as a source, it is further evaluated for any necessary processing. Any of the aforementioned processing necessary to overcome the incongruities in codec, bitrate, etc. are identified per step 510, and performed or scheduled as required per step 512. In this context, the scheduling may comprise for example: (i) immediate processing by the source CPE (or even an intermediary node, such a server) in anticipation of a burst, streaming or other delivery; or (ii) delayed processing either locally or remotely, such as after delivery to the sink peer, or before onset of later-occurring delivery. Myriad possible schedules for performing this processing will be recognized by those of ordinary skill, and hence are not described further herein.

Per step 514, the processed (or to-be processed) content is then delivered to the sink peer or its proxy. This delivery may also include metadata, protocol messaging, or the like with instructions or other information on required processing. For example, the source might include metadata indicating that the delivered content is encoded in Real format, and must be transcoded to Windows Media before use.

It will be appreciated that two or more of the foregoing steps can be combined or integrated, such as where for example the selection and evaluation of a prospective source peer are performed concurrently (i.e., peers are filtered based on incompatibilities, and only "eligible" peers selected for further evaluation or processing.

Content Access and Security—

The various embodiments of the invention advantageously may comprise anything ranging from no access control, source authentication or content protection (or even knowledge of the identity of the source) to stringent control and protection (e.g., imposition of conditional access rules, authentication, encryption, DRM, and/or watermarking), depending on the particular application and MSO/subscriber preferences.

For example In one embodiment, the source may act to provide content elements without any CA, DRM or other entitlement or rights analysis being performed prior to delivery to the requesting or sink peer.

In another embodiment of the invention, a source peer (e.g. CPE with DVR) can be required to enforce a specific entitlement for the content elements (e.g., program) being requested so as to prevent unauthorized viewing and propagation. This restriction can also be implemented selectively based on other parameters such as the presence of a trusted domain (TD) or authorized service domain (ASD) within the requesting peer, based on the amount or volume of content requested (e.g., short snippets or small groups of packets may be freely distributed, much along the lines of a trailer), and so forth. Exemplary apparatus and methods for establishing trusted domains or ASDs are described in co-owned U.S. patent application Ser. No. 11/006,404 filed Dec. 7, 2004, entitled "Technique For Securely Communicating And Storing Programming Material In A Trusted Domain", and issued as U.S. Pat. No. 8,312,267 on Nov. 13, 2012, which is incorporated herein by reference in its entirety. This approach comprises using two cryptographic elements (e.g., encryption keys), associated with a user and his/her client device(s), respectively, that control access to content stored in the client device(s) within the domain. For example, the content stored in the client device may be encrypted using a private or secret key in accordance with the DES or AES algorithms. When the encrypted content is transported from the client device to another device within the domain associated with the same user (or other common parameter or feature), the second device needs the cryptographic element (e.g., the secret key) to decrypt the encrypted content. To that end, the second device also receives from the source device an encrypted version of this secret key. The latter is generated by encrypting the secret key using a second and distinct cryptographic element (e.g., a public key in accordance with a public key algorithm) associated with the subscriber. The second device provides the encrypted version of the secret key to a remote apparatus, e.g., in a headend server, where the secret key is recovered based on at least the encrypted version of the secret key and data relating to that user or client device. The second device then receives from the headend another encrypted version of the secret key, which is generated by encrypting the recovered secret key using a third cryptographic element (e.g., a public key in accordance with a public key algorithm) associated with the second device. Based on at least this second encrypted version of the secret key, the secret key can be recovered in the second device to decrypt the encrypted content.

In another embodiment, the delivery of the content can be refused or suspended until the requesting client authenticates itself, obtains proper DCAS or other configuration (including having a proper personalized and common image disposed thereon), etc. Exemplary methods and apparatus for provisioning and establishing a downloadable conditional access (DCAS), DRM, or TD environment within a peer within a content-based network are described in co-owned and co-pending U.S. patent application Ser. No. 11/584,208 filed Oct. 20, 2006 entitled "DOWNLOADABLE SECURITY AND PROTECTION METHODS AND APPARATUS", issued as U.S. Pat. No. 8,520,850 on Aug. 27, 2013, and U.S. patent application Ser. No. 11/657,828 filed Jan. 24, 2007 entitled "APPARATUS AND METHODS FOR PROVISIONING IN A DOWNLOAD-ENABLED SYSTEM", issued as U.S. Pat. No. 8,621,540 on Dec. 31, 2013, each of the foregoing incorporated herein by reference in its entirety.

Similarly, peers can provide non-personalized portions of the foregoing "common" DCAS or similar software image to other requesting peers using the mechanisms described herein.

It is noted, however, that proper CA or authentication credentials need not necessarily be tied to a particular subscriber or box. Using the aforementioned techniques for anonymous CPE identification (e.g., one-way cryptographic hash of MAC, TUNER ID, etc.), source peers can verify to at least some degree that the requesting peer has proper credentials, but never make an actual association to a particular subscriber or location (e.g., its secure microprocessor). The same is true of any server process 252 or tracker used; the identification of source and sink peers, their permissions and access privileges, etc. can be maintained uniquely yet without specific knowledge of the associated subscriber if desired. This advantageously provides prospective peer pool participants a level of anonymity, thereby providing them further incentive to participate as a peer.

In yet another embodiment, the requesting or sink peer is configured to determine whether the source peer itself comprises a "trusted" source (e.g., via authentication such as via IEEE-Std. 802.1x or other approaches, etc.), irrespective of whether the content itself was surreptitiously obtained or not. There may also be different grades or levels of trust, such as e.g., MSO-certified, simply authenticated as being who they say they are, etc.

In still another embodiment, the requesting or sink peer is configured to evaluate not only the trust level of the source as previously described, but also the DRM or other rights management and/or conditional access aspects of the requested content itself (including its integrity). For example, in one variant, a cryptographic element (e.g., hash value, digital signature, key, etc.) associated with the requested content is required to be passed between the source and sink process, wherein the sink process uses this information to evaluate the authenticity and/or integrity of the content, peer source, or both. Any number of well known cryptographic approaches may be used for this purpose, as will be recognized by those of ordinary skill.

Alternatively, the content can be verified or protected only (irrespective of the authentication or verification of the source), in effect caring only about the integrity or authenticity of the content irrespective of where it came from. One such approach may simply evaluating DRM or steganographic data (e.g., digital watermarking) within the content to identify its source, and whether it has been previously copied or not. Another such approach may comprise encryption of the content; if the content is decrypted with the proper key, then it is presumed to have been protected at least between the source and sink peers. Hashes, digital signatures or checksums can also be applied to determine if the content has been modified or compromised. Myriad other such approaches will be appreciated and implemented by those of ordinary skill.

Network Server—

Figure 6:
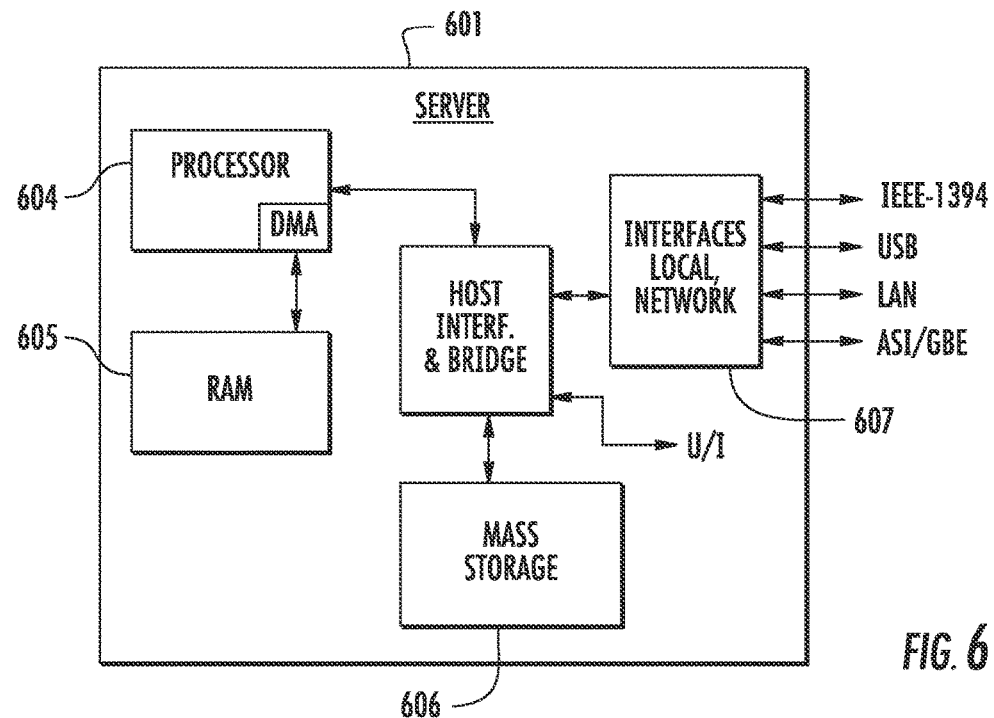
FIG. 6 is a functional block diagram illustrating an exemplary embodiment of a network server device with P2P server (e.g., tracker) functionality according to the invention.

Referring now to FIG. 6, one embodiment of the improved network server device with P2P capability according to the present invention is described. As shown in FIG. 6, the device 601 generally comprises and OpenCable-compliant BSA network server module 196 adapted for use at the hub site of FIG. 1c, although the server may comprise other types of devices (e.g., VOD or application servers) within the network as previously described, including those at the headend 150.

The server 601 comprises a digital processor(s) 604, storage device 606, and a plurality of interfaces 607 for use with other network apparatus such as RF combiners, IP routers and other packet network devices, network management and provisioning systems, local PCs, etc. Other components which may be utilized within the server device 601 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the server and the CPE 106. The server process application 252 (FIG. 2*a*) is also disposed to run on the server module 601, and can be configured to provide a functional interface with the client process 254 on the various network CPE 106, or other interposed or remote entities. These components and functionalities are well known to those of ordinary skill in the cable and embedded system fields, and accordingly not described further herein.

The server device 601 of FIG. 6 may take any number of physical forms, comprising for example one of a plurality of discrete modules or cards within a larger network edge or hub device of the type well known in the art. The server may also comprise firmware, either alone or in combination with other hardware/software components such as those previously described (e.g., disposed in the aforementioned edge device). Alternatively, the server module 601 may be a stand-alone device disposed at the hub or other site, and may even include its own RF front end (e.g., modulators, encryptors, etc.) or optical interface so as to interface directly with various portions of the HFC network 101. Numerous other configurations may be used. The server device 601 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the tracker functionality described above may take the form of one or more computer programs (e.g., the server and client processes, 252, 254). Alternatively, such computer programs may have one or more components distributed across various hardware environments at the same or different locations, such as where the server process 252 is distributed across multiple platforms at the hub site and the headend 150.

As yet another example, portions of the functionality may be rendered as a dedicated or application specific IC having code running thereon. Myriad different configurations for practicing the invention will be recognized by those of ordinary skill in the network arts provided the present disclosure.

CPE—

Figure 7:
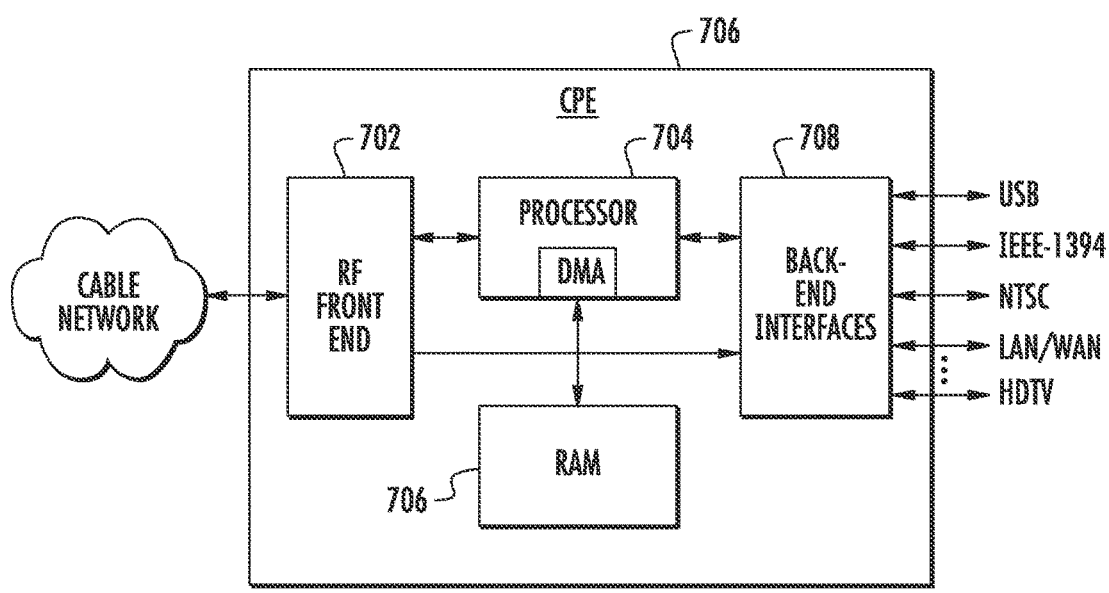
FIG. 7 is a functional block diagram illustrating an exemplary embodiment of CPE with P2P capability.

FIG. 7 illustrates an exemplary embodiment of the improved P2P-capable CPE 106 according to the present invention. As shown in the simplified diagram of FIG. 7, the device 106 generally comprises and OpenCable-compliant embedded system having an RF front end 702 (including tuner(s) and demodulator/decryptors) for interface with the HFC network 101 of FIGS. 1-1*c,* digital processor(s) 704, storage device 706, and a plurality of interfaces 708 (e.g., video/audio interfaces, IEEE-1394 "Firewire", USB, serial/ parallel ports, etc.) for interface with other end-user apparatus such as televisions, personal electronics, computers, WiFi or other network hubs/routers, etc. Other components which may be utilized within the device (deleted from FIG. 7 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 7 is also provided with an OCAP 1.0-compliant application and Java-based middleware which, inter alia, manages the operation of the device and applications running thereon (including optionally the P2P client process application 254). It will be recognized by those of ordinary skill that myriad different device and software architectures may be used consistent with the P2P request, receipt and reconstitution functions of the present invention, the device of FIG. 7 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support any user-accessible functions of the client process 254 (e.g., specifying available P2P sources windows, preferences, etc.).

In another embodiment, the CPE 106 comprises a converged premises device, such as for example that described in co-owned U.S. patent application Ser. No. 11/378,129 filed Mar. 16, 2006, entitled "METHODS AND APPARATUS FOR CENTRALIZED CONTENT AND DATA DELIVERY", and issued as U.S. Pat. No. 8,347,341 on Jan. 1, 2013, incorporated herein by reference in its entirety.

In one embodiment, the CPE middleware is used to perform the content evaluation, acquisition, and reconstitution processes. This advantageously provides for a substantially automated and transparent process (if desired) with no user interaction or intervention required.

In another embodiment, the user is given the ability to interact or intervene with the process (e.g., a "permissive" mode, such as wherein contacts with other peer devices (or even participation in the peer process in general) must be approved, whether as a content requester (sink) or a content provider (source).

It will be appreciated from the foregoing discussion that the apparatus and methods of the present invention are also readily implemented into extant cable or other network infrastructure without significant modification. No modifications to QAM modulators, decoders, statistical multiplexing algorithms, BSA switching algorithms, or the like are required. For example, in one embodiment, the server and client processes comprise substantially stand-alone modules which can be loaded onto their respective devices. Client software changes can be made via download if desired, such as via the methods and apparatus of co-pending and co-owned U.S. patent application Ser. No. 11/607,663 filed Dec. 1, 2006 and entitled "Methods and Apparatus for Software Provisioning of a Network Device", incorporated herein by reference in its entirety. Moreover, the foregoing approach allows for delivery of the software to limited subsets of the subscriber base if desired, such as for beta testing, trial, and so forth.

In another aspect of the invention, methods and apparatus for managing the allocation and use of CPE or peer assets is described. In one embodiment, this apparatus comprises a computer program or routine such as e.g., one integrated with the peer client process 254 disposed on the CPE, and a corresponding program or routine in the server process 252. This program determines critical attributes of the relevant peer(s) such as one or more of e.g., CPE or DVR storage capability (e.g., the amount of space currently available on the resident mass storage device), the CPU loading of the device, hardware and software assets available (via e.g., a hardware registry of the type described in co-owned U.S. patent application Ser. No. 10/723,959 filed Nov. 24, 2003, entitled "METHODS AND APPARATUS FOR HARDWARE REGISTRATION IN A NETWORK DEVICE", and issued as U.S. Pat. No. 8,302,111 on Oct. 30, 3012, incorporated herein by reference in its entirety), required bitrate, required content resolution, etc., and determines the proper use or allocation of these assets according to a variable priority structure. Such priority structure can be dynamically re-evaluated so that indigenous or local functions (e.g., viewing content, storing a content download, playing back stored content, etc.) are considered and not interrupted or adversely affected by peer activities, whether sourcing or sinking This is an important function, since subscriber frustration would rapidly increase if the normal, seamless operation that they have come to expect from their cable network were even periodically interrupted or affected. Hence, the management process described herein has as one aim maintaining the P2P content sharing and transcoding, transrating, etc. processes entirely in the background unless user interaction, such as for configuration of preferences or options) is desired.

For example in one embodiment, the management function comprises simply allocating portions of the resident mass storage device to "peer" activities and non-peer activities; i.e., those that may be needed for either acting as a source or sink as previously described, and those necessary to support indigenous functions and components such as download and recording, operating system and middleware files, software applications, etc. These areas are not necessarily mutually exclusive (e.g., the user download and record area can also be used during peer source mode).

Moreover, these attributes can be remotely controlled by the server portion 252 (and hence the MSO) if desired. For example, as part of one business model, the subscriber acting as a source peer might cede control of some of the configuration aspects of his/her CPE (e.g., storage space allocated for peer activities), so that the MSO could make use of it to selectively cache content. Similarly, the source peer subscriber might be willing to accept increases in the latency of certain services in exchange for consideration or other incentives, with the increased latency allowing the MSO to, inter alia, allocate the resources of that peer (such as more CPU cycles, more upstream bandwidth, etc.) to servicing content requests.

Similarly, the MSO might control the state of certain operations (e.g., delay or reschedule maintenance, disk utilities, etc.) in favor of servicing content delivery, transcoding, transrating, or similar requests. Conversely, where the delivery mode is highly latent (e.g., trickle or opportunistic), the transcoding, transrating, and similar tasks may be selectively delayed as need be in order to accommodate more immediate needs.

Hence, the present invention contemplates not only that CPE will by dynamically selectable as peers (or not as peers), but also that any selected peers may also be dynamically reconfigurable.

Business Methods and "Rules" Engine—

In another aspect of the invention, the aforementioned server process 252 (e.g., rendered as one or more computer programs, such as the exemplary tracker of FIG. 4*a*) optionally includes a business rules engine. This engine comprises, in an exemplary embodiment, a series of software routines running on the server device 601, client 106, or other associated hardware/firmware environment adapted to control the operation of the content acquisition delivery and reconstitution algorithms previously described. These rules may also be fully integrated within the server process 252 itself, and controlled via e.g., a GUI on a PC connected to the server 601 or a remote network location (such as a network administrator's console). In effect, the rules engine comprises a supervisory entity which monitors and selectively controls, via the server process 252 and/or CPE process 254, the acquisition delivery and reconstitution functions at a higher level, so as to implement desired operational or business rules. The rules engine can be considered an overlay of sorts to the P2P management algorithms of the server process 252 previously described. For example, the server process 252 may invoke certain operational protocols or decision processes based on data received from the CPE 106 (e.g., subscriber P2P participation preferences, CPE profiling or operational status data, etc.), as well as network operational or historical data, demographic data, geographic data, etc. However, these processes may not always be compatible with higher-level business or operational goals, such as maximizing profit or system reliability. Hence, when imposed, the business/operational rules can be used to dynamically (or manually) control the operation of the server process 252 (and/or client process 254), in conjunction with the operational "recommendations" generated by the server process 252 as part of acquisition, delivery and/or reconstitution functions previously described.

For example, one rule implemented by the rules engine may comprise selectively servicing (or at least queuing first) requests from certain users first; e.g., those with a higher subscription priority or level under bandwidth-limited cases, and only after this tier of users is satisfied, servicing remaining content requests (e.g., "head-of-the-line" privilege). Alternatively, the premium subscribers could be serviced using the preferred or faster mechanism at any given time, whether that be P2P or direct from a content server.

Another rule might allow for the relegation of low-priority requests to the back of the service queue; e.g., those associated with subscriber requests that are not time-critical. For instance, real-time "creep-ahead" requests that must be serviced in order to maintain stream delivery continuity would be serviced and queued first, whereas opportunistic or high-latency requests would be serviced last.

Similarly, peers can be allocated to those users which, e.g., based on demographics, historical patterns, geographic area, etc. will make best use of the requisite bandwidth in terms of monetary return, profit, or some other business performance metric. For example, the MSO might invoke a business rule that selectively services requests for the best or most lucrative zip codes (or demographic slices) first. Such switching to certain zip codes can be performed using, inter alia, the methods and apparatus set forth in co-owned U.S.

patent application Ser. No. 11/186,452 entitled "METHOD AND APPARATUS FOR BOUNDARY-BASED NETWORK OPERATION", previously referenced and incorporated herein.

Many other approaches and combinations are envisaged consistent with the invention, as will be recognized by those of ordinary skill when provided this disclosure. An example is the application of business rules based on content or content-provider related metrics versus those of the subscriber. For example, prioritization or servicing of certain requests might be based on the content that is requested. In one variant, if multiple requests are for the same content, and this content can be delivered efficiently to all requesters (e.g., economy-of-scale) versus servicing multiple heterogeneous requests which would consume more bandwidth, then these requests would be prioritized and serviced. In effect, this gives the MSO the most "bang for the buck" in terms of allocating its bandwidth. Similarly, P2P sessions might be suspended or delayed in starting until enough peers are present to make the delivery sufficiently efficient. This is somewhat akin to the size of the pool in well known statistical multiplexing techniques; better statistics are obtained as the pool size exceeds a certain threshold level. Similarly, better bandwidth conservation or "edge" use may be associated with a higher number of participating peers. This is due to, inter alia, the elimination of more otherwise "unicast" channels (e.g., VOD delivery streams, etc.) in favor of more multicast or peer channels of delivery. This underscores yet another benefit of the invention; i.e., the greater use of multicast distribution channels within the network (especially at the edge), which moves the network away from a "one client-one stream" delivery model, thereby conserving bandwidth, especially at the core of the network.

Enforcement of the foregoing business rules may be executed by servers or server processes 252 separately for each service (e.g. BSA or VoD) or centrally via the controlling actions of a master SRM (Session and Resource Manager) or other network agent.

In another variant, the subscriber is provided with the opportunity to "trickle" obtain the content (which may be at an unpredictable rate, and/or be completed at an unpredictable time) in exchange for, e.g., a discount or other such consideration. This approach allows the network operator an added degree of control and flexibility in managing network bandwidth, since such requests can be serviced opportunistically albeit via network peers.

The availability or ability to act as a peer within the network may also provide a basis for a business model. For example, the MSO might offer incentives, payment, credits, etc. to subscribers for acting as peers. Peers might be required to e.g., leave their DVR and DSTB on all day and night, or during certain windows of time/date. Peers might also be placed in a standby list; e.g., during times of high loading the peer is called into service, but otherwise operates unfettered. The subscriber might also simply relinquish control of their equipment to the MSO, thereby alleviating the subscriber of any affirmative actions (other than making sure that their equipment is plugged in and connected).

Similarly, peers might be compensated, given incentives, etc. based on actual use; e.g., number of .torrent file requests serviced, etc. In another possible scheme, peer sinks in the program would lose credits for each request for content from another peer, and peer sources gain credits for each action as a content source, thereby providing incentives to act as a source to prevent source or peer "decay" over time (one of the significant deficiencies ostensibly noted in the commercial use of BitTorrent over the web).

Moreover, the quality or breadth of content available on a given subscriber's DVR or storage medium might be factored into this model, such as where the subscribers with larger capacity DVRs and more content, or content that meets certain criteria (e.g., first run versus older content, "pedigreed" from trusted source, has traceable DRM, origin, or reproduction information, etc.) are more handsomely compensated.

Peer source/sink credits could also be assigned or traded.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Customer premises equipment (CPE) configured for peer-based content delivery within a content delivery network, said CPE comprising:
    a network interface;
    a storage device; and
    a processor apparatus in data communication with at least one of said storage device and/or said network interface, said processor apparatus configured to run at least one computer program thereon, said at least one computer program comprising a plurality of instructions which are configured to when executed:
        receive data from an external computerized entity relating to a request for digitally rendered content;
        identify, using at least said received data, said requested digitally rendered content stored on said storage device;
        process said requested digitally rendered content to include data implementing one or more content protection schemes; and
        transmit said processed digitally rendered content including said data implementing one or more content protection schemes to said external computerized entity via said network interface;
    wherein access to said transmitted processed content comprises a delay, said delay comprising at least a period of time until one or more elements of said processed digitally rendered content that require reconstitution have been reconstituted.

2. The CPE of claim 1, wherein said content delivery network comprises a cable television network, and said CPE comprises an OCAP (OpenCable) compliant set-top box having at least one tuner, demodulator, and middleware.

3. The CPE of claim 2, wherein said at least one computer program comprises a client application downloaded to said CPE over said content delivery network via said at least one tuner.

4. The CPE of claim 1, wherein said external computerized entity comprises a second CPE configured for peer-based content delivery within said content delivery network.

5. The CPE of claim 1, wherein said one or more content protection schemes comprises decryption and re-encryption using a trusted domain key to which only authorized entities have access.

6. The CPE of claim 1, wherein said plurality of instructions are further configured to when executed, process authentication data provided from said external computerized entity to determine an entitlement of said external computerized entity to receive said requested digitally rendered content.

7. A non-transitory computer readable apparatus having a storage medium comprising at least one computer program, said at least one computer program comprising a plurality of instructions which, when executed on a host device, are configured to:
receive data representative of a request for digitally rendered content from a computerized client device external to said host device, said request comprising information relating to an authorized service domain which said computerized client device is operative within;
based at least on a computerized determination that one or more portions of said digitally rendered content require reconstitution:
populate a pool with a plurality of computerized client devices according to one or more criteria; and
identify one or more of said plurality of computerized client devices as having one or more digital content elements configured for use in said reconstitution of said one or more portions;
determine whether said authorized service domain which said computerized client device is within comprises an authorized service domain having access to said requested digitally rendered content; and
when it is determined that said authorized service domain has access to said requested digitally rendered content, transmit said requested digitally rendered content from said host device to said computerized client device.

8. The computer readable apparatus of claim 7, wherein said host device comprises a computerized client device having at least one tuner, demodulator, and middleware.

9. The computer readable apparatus of claim 8, wherein said at least one computer program comprises a client application downloaded to said host device over a content delivery network via said at least one tuner.

10. The computer readable apparatus of claim 7, wherein when it is determined that said authorized service domain does not have access to said requested digitally rendered content, preventing said digitally rendered content from being transmitted from said host device to said computerized client device.

11. The computer readable apparatus of claim 7, wherein said plurality of instructions, when executed on said host device, are further configured to identify and perform any transcoding or transrating requirement of said requested digitally rendered content prior to said transmission thereof.

12. Customer premises equipment (CPE) configured for peer-based content delivery within a content delivery network, comprising:
a network interface;
a storage device; and
a processor apparatus in data communication with said storage device and said network interface, said processor apparatus configured to run at least one computer program thereon, said at least one computer program comprising a plurality of instructions which are configured to, when executed:
evaluate data relating to a plurality of digitally rendered content, the digitally rendered content available via peer-based content delivery;
issue a request for an individual one of said plurality of digitally rendered content to one or more of a plurality of computerized peer devices from which said plurality of digitally rendered content is available, said request comprising at least data relating to a security feature of said CPE; and
receive said individual one of said plurality of digitally rendered content via said network interface, said individual one of said plurality of digitally rendered content being transferred thereto securely using at least said security feature of said CPE;
wherein said security feature enables users and locations associated with said CPE and said one or more of said plurality of computerized peer devices to remain anonymous via use of at least a one-way cryptographic hash.

13. The CPE of claim 12, wherein said security feature comprises a trusted domain key.

14. The CPE of claim 12, wherein said security feature comprises a common image associated with a downloadable conditional access (DCAS) system.

15. The CPE of claim 12, wherein said evaluation, said issuance of said request, and said receipt of said individual one of said digitally rendered content are performed within a time frame that permits real time streaming of said individual one of said digitally rendered content to said CPE.

16. The CPE of claim 12, wherein said request is issued to a proxy server in communication with said plurality of computerized peer devices from which said plurality of digitally rendered content is available, said proxy server being configured to determine which one or more of said plurality of computerized peer devices from which said plurality of digitally rendered content is available to forward said request.

17. The computer readable apparatus of claim 7, wherein:
said population of said pool with said plurality of computerized client devices according to said one or more criteria comprises a population of only computerized client devices within a certain geographic portion of a content delivery network as determined based at least in part on one or more zip codes associated thereto; and
said identification of said one or more of said plurality of computerized client devices comprises anonymous identification based on a use of a cryptographic hash.

18. The computer readable apparatus of claim 7, wherein:
said population of said pool with said plurality of computerized client devices according to said one or more criteria comprises a population of only computerized client devices that opted-in to be a peer source; and
said identification of said one or more of said plurality of computerized client devices is based at least in part on status information, a delivery time window, and statistically modeled data, said statistically modeled data comprising a metric of predictability relating to said pool.

19. The computer readable apparatus of claim 7, wherein said population of said pool with said plurality of computerized client devices according to said one or more criteria comprises a population of only computerized client devices within a certain geographic portion of a content delivery network as determined based at least in part on respective Internet Protocol (IP) addresses associated with said plurality of computerized client devices.

20. The computer readable apparatus of claim 7, wherein said receipt of said data representative of said request, said computerized determination, and said transmission are performed within a time frame that permits real time streaming of said digitally rendered content from said host device to said computerized client device.

* * * * *